(12) United States Patent
Lecocq et al.

(10) Patent No.: US 10,598,807 B2
(45) Date of Patent: Mar. 24, 2020

(54) CORRECTION OF SEA SURFACE STATE

(71) Applicant: PGS Geophysical AS, Oslo (NO)

(72) Inventors: Paul Lecocq, West Ealing (GB); Edwin Thomas Hodges, Woking (GB); Magdy Attia Sedhom, Surrey (GB)

(73) Assignee: PGS Geophysical AS, Oslo (NO)

( * ) Notice: Subject to any disclaimer, the term of this patent is extended or adjusted under 35 U.S.C. 154(b) by 533 days.

(21) Appl. No.: 14/338,516

(22) Filed: Jul. 23, 2014

(65) Prior Publication Data

US 2015/0234065 A1 Aug. 20, 2015

Related U.S. Application Data

(60) Provisional application No. 61/941,383, filed on Feb. 18, 2014.

(51) Int. Cl.
*G01V 1/38* (2006.01)
*G01V 1/36* (2006.01)

(52) U.S. Cl.
CPC .............. *G01V 1/38* (2013.01); *G01V 1/366* (2013.01)

(58) Field of Classification Search
CPC ........................................................ G01V 1/38
USPC ............................................................ 702/14
See application file for complete search history.

(56) References Cited

U.S. PATENT DOCUMENTS

| | | | |
|---|---|---|---|
| 4,739,858 A | 4/1988 | Dragoset, Jr. | |
| 5,570,099 A * | 10/1996 | DesJardins | G01S 5/06 342/378 |
| 5,761,152 A | 6/1998 | Jacobsen et al. | |
| 5,771,170 A * | 6/1998 | Withers | G01V 1/008 702/14 |
| 6,681,887 B1 * | 1/2004 | Kragh | G01V 1/38 181/110 |
| 6,751,559 B2 | 6/2004 | Fookes et al. | |
| 6,882,938 B2 | 4/2005 | Vaage et al. | |
| 6,906,981 B2 | 6/2005 | Vaage et al. | |
| 7,031,223 B2 | 4/2006 | Kinkead | |
| 7,257,049 B1 | 8/2007 | Laws et al. | |

(Continued)

FOREIGN PATENT DOCUMENTS

| | | |
|---|---|---|
| EP | 2762926 A2 | 8/2014 |
| GB | 2344889 A | 6/2000 |

(Continued)

OTHER PUBLICATIONS

Zhang et al., "A marine node simultaneous source acquisition trial at Atlantis, Gulf of Mexico," SEG Houston 2013 Annual Meeting, SEG Technical Program Expanded Abstracts, pp. 99-103, 2013.

(Continued)

*Primary Examiner* — Janet L Suglo
*Assistant Examiner* — Douglas Kay

(57) ABSTRACT

A method for correction of a sea surface state can include receiving geophysical data from a seismic survey, wherein the seismic survey utilizes a plurality of receivers disposed in a body of water and at least one source in the body of water, actuated at a plurality of shot points. The method can include identifying, in the geophysical data, a wavefield based on the actuation of the at least one source, and determining, based on the identified wavefield, a sea surface state at the at least one source at one of the plurality of shot points.

12 Claims, 14 Drawing Sheets

(56) References Cited

U.S. PATENT DOCUMENTS

| | | | |
|---|---|---|---|
| 7,391,673 | B2 | 6/2008 | Regone et al. |
| 7,502,690 | B2 | 3/2009 | Thomsen et al. |
| 7,869,303 | B2 | 1/2011 | Kinkead |
| 7,872,942 | B2 * | 1/2011 | Sollner .................... G01V 1/38 367/21 |
| 7,916,576 | B2 | 3/2011 | Beasley et al. |
| 7,941,273 | B2 | 5/2011 | Thomsen et al. |
| 8,218,393 | B2 | 7/2012 | Beasley |
| 8,295,124 | B2 | 10/2012 | Abma |
| 8,299,784 | B2 | 10/2012 | Farrelly et al. |
| 8,345,510 | B2 | 1/2013 | Hegna et al. |
| 8,395,966 | B2 | 3/2013 | Moore et al. |
| 8,427,901 | B2 | 4/2013 | Lunde et al. |
| 8,559,270 | B2 | 10/2013 | Abma |
| 8,588,025 | B2 | 11/2013 | Moldoveanu et al. |
| 8,596,409 | B2 | 12/2013 | Parkes et al. |
| 8,605,541 | B2 * | 12/2013 | Robertsson ............ G01V 1/364 367/21 |
| 8,730,760 | B2 | 5/2014 | Cambois et al. |
| 8,892,413 | B2 * | 11/2014 | Routh ...................... G01V 1/28 702/6 |
| 9,097,783 | B2 * | 8/2015 | Mathews ................ G01S 5/021 |
| 9,229,123 | B2 * | 1/2016 | Pan .......................... G01V 1/36 |
| 9,234,977 | B2 * | 1/2016 | Ferber ..................... G01V 1/364 |
| 9,341,726 | B2 * | 5/2016 | Kostov .................... G01V 1/28 |
| 9,684,085 | B2 * | 6/2017 | Grion ...................... G01V 1/308 |
| 2002/0181328 | A1 | 12/2002 | de Kok |
| 2004/0013037 | A1 | 1/2004 | Vaage |
| 2005/0034917 | A1 | 2/2005 | Mathiszik et al. |
| 2008/0019214 | A1 | 1/2008 | Pramik |
| 2008/0094066 | A1 * | 4/2008 | Watts ...................... G01V 3/083 324/337 |
| 2008/0159074 | A1 * | 7/2008 | Guis ....................... G01V 1/364 367/40 |
| 2009/0122643 | A1 * | 5/2009 | Guigne ................... G01V 1/28 367/38 |
| 2009/0168600 | A1 | 7/2009 | Moore et al. |
| 2009/0323472 | A1 | 12/2009 | Howe |
| 2009/0326895 | A1 | 12/2009 | Beasley |
| 2010/0039894 | A1 | 2/2010 | Abma |
| 2010/0302900 | A1 | 12/2010 | Tenghamn |
| 2011/0044127 | A1 | 2/2011 | Kostov et al. |
| 2011/0079461 | A1 | 4/2011 | Allen et al. |
| 2011/0141850 | A1 | 6/2011 | Scott et al. |
| 2012/0014212 | A1 | 1/2012 | Eick et al. |
| 2012/0033525 | A1 | 2/2012 | Abma et al. |
| 2012/0033526 | A1 * | 2/2012 | Hegna ..................... G01V 1/364 367/21 |
| 2012/0044782 | A1 | 2/2012 | Bekara |
| 2012/0095689 | A1 * | 4/2012 | Kostov .................... G01V 1/28 702/14 |
| 2012/0147699 | A1 | 6/2012 | Dellinger et al. |
| 2012/0147701 | A1 | 6/2012 | Ross et al. |
| 2012/0155217 | A1 | 6/2012 | Dellinger et al. |
| 2012/0155218 | A1 | 6/2012 | Beasley et al. |
| 2012/0176861 | A1 | 7/2012 | Abma et al. |
| 2012/0307591 | A1 | 12/2012 | Hegna et al. |
| 2013/0028048 | A1 | 1/2013 | Sollner |
| 2013/0028049 | A1 * | 1/2013 | Pan .......................... G01V 1/36 367/24 |
| 2013/0028051 | A1 | 1/2013 | Barkved et al. |
| 2013/0088235 | A1 | 4/2013 | Hegna et al. |
| 2013/0088938 | A1 | 4/2013 | Aaron et al. |
| 2013/0121109 | A1 | 5/2013 | Baardman et al. |
| 2013/0322205 | A1 | 12/2013 | Widmaier et al. |
| 2014/0016436 | A1 | 1/2014 | Sollner et al. |
| 2014/0140168 | A1 | 5/2014 | Howe |
| 2014/0198605 | A1 * | 7/2014 | Grion ..................... G01V 1/308 367/7 |
| 2014/0355379 | A1 | 12/2014 | Moldoveanu et al. |
| 2016/0178772 | A1 * | 6/2016 | Carter ................... G01V 1/306 702/17 |

FOREIGN PATENT DOCUMENTS

| | | | |
|---|---|---|---|
| GB | 2390902 | A | 1/2004 |
| GB | 2405473 | A * | 3/2005 .............. G01V 1/36 |
| WO | 0057207 | | 9/2000 |
| WO | 2009131619 | A2 | 10/2009 |
| WO | 2014028415 | A1 | 2/2014 |

OTHER PUBLICATIONS

Jiang et al., "An analysis on the simultaneous imaging of simultaneous source data," SEG Denver 2010 Annual Meeting, Oct. 17-22, 2010, Denver, CO, 5 pp.

Abma et al., "An overview of BP's Marine Independedent Simultaneous Source Fields," SEG 2012 Las Vegas Annual Meeting, Nov. 4-9, 2012, Las Vegas, NE.

Abma et al., "Sparse inversion and the distribution of airgun array energy over time," SEG Houston 2013 Annual Meeting, SEG Technical Program Expanded Abstracts, pp. 31-35.

Akerberg, "Simultaneous source separation by sparse Radon transform," SEG 2008 Las Vegas Annual Meeting, Nov. 9-14, Las Vegas, NE, 5 pp.

Alexander et al., "Processing results of simultaneous source surveys compared to conventional surveys," SEG Houston 2013 Annual Meeting, SEG Technical Program Expanded Abstracts, pp. 104-108.

Howe et al., "Independent Simultaneous Sweeping in Libya—full scale implementation and new developments," 2009 SEG Annual Meeting, Oct. 25-30, Houston, TX, 3 pp.

Spitz et al., "Simultaneous source separation: a prediction-subtraction approach," SEG 2008 Las Vegas Annual Meeting, Nov. 9-14, Las Vegas, NE, 5 pp.

Moore et al., "Simultaneous Source Separation Using Dithered Sources," SEG Las Vegas 2008 Annual Meeting, pp. 2806-2810.

Orji et al., "Imaging 3D Sea Surfaces from 3D Dual-Sensor Towed Streamer Data," International Journal of Geophysics, vol. 2013, article 387175, Mar. 18, 2013, 13 pp.

Orji et al., "Time-Varying Sea Surfaces From 3D Dual-Sensor Streamer Data," presented at the 74th EAGE Conference, Oslo, Norway, Jun. 4, 2012, 43 pp.

UK Search Report dated Aug. 6, 2015, in the prosecution of patent application No. GB1502341.9, 4 pages.

Mexican Office Action for related Mexican Application No. MX/a/2015/002125, dated Jan. 30, 2017 (3 pgs) (English Translation and Original Copy).

First Full Examination Report for related Australian Application No. 2015200555, dated Nov. 11, 2019 (5 pgs).

* cited by examiner

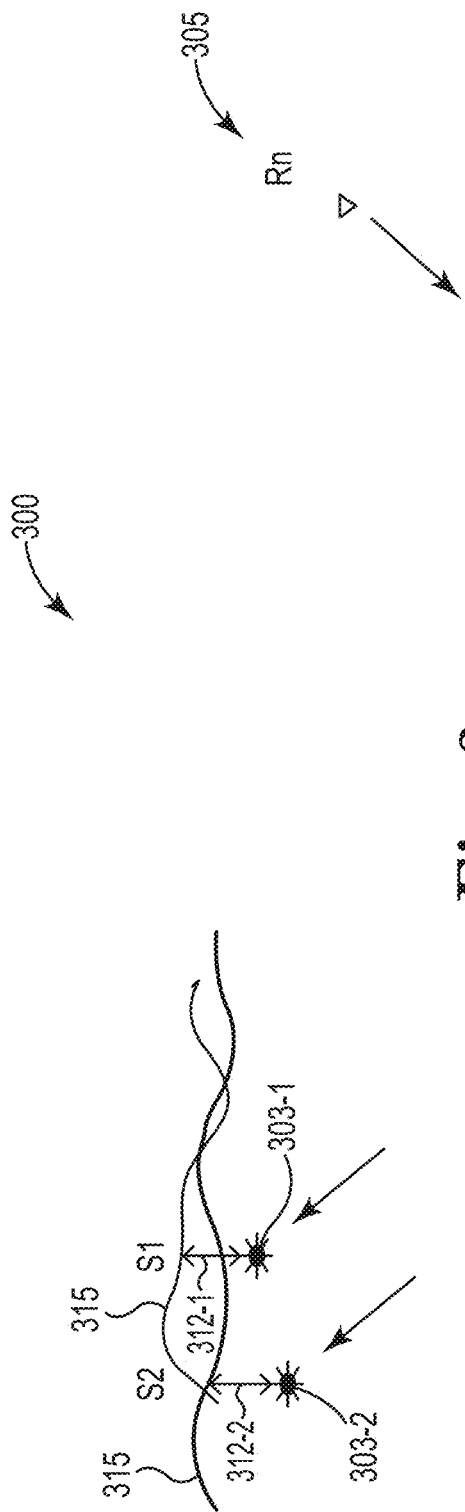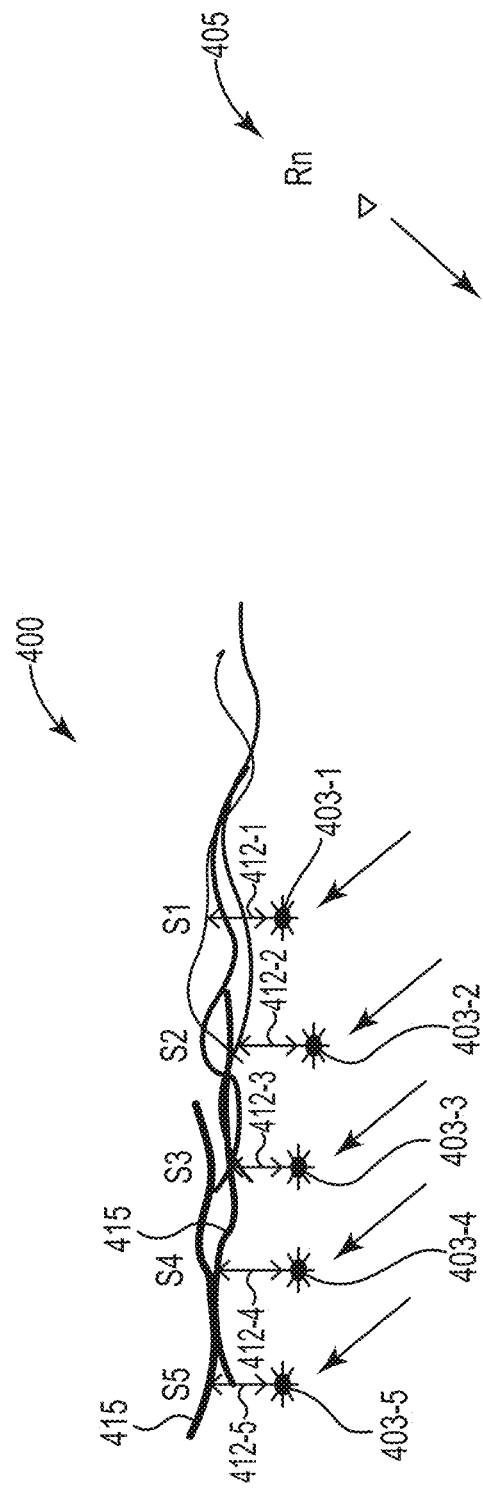

CORRECTION OF SEA SURFACE STATE

CROSS-REFERENCE TO RELATED APPLICATIONS

This application claims priority to U.S. Provisional Application 61/941,383, filed Feb. 18, 2014, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine seismic survey vessel tows one or more seismic sources below the surface of the water and over a subterranean formation to be surveyed for mineral deposits. Seismic receivers may be located on or near the water bottom, on one or more streamers towed by the source vessel, or on one or more streamers towed by another vessel. The source vessel typically contains marine seismic survey equipment, such as navigation control, seismic source control, seismic receiver control, and recording equipment. The seismic source control may cause the one or more seismic sources, which are typically air guns or marine vibrators, to produce acoustic signals at selected times (often referred to as "firing a shot" or "shooting").

Each acoustic signal is essentially a sound wave that travels down through the water and into the subterranean formation. At each interface between different types of rock, a portion of the sound wave may be refracted, a portion of the sound wave may be transmitted, and another portion may be reflected back toward the body of water to propagate toward the surface. The streamers towed behind the vessel are generally elongated cable-like structures. Each streamer includes a number of seismic receivers that detect pressure and/or particle motion changes in the water created by the sound waves reflected back into the water from the subterranean formation. The receivers thereby measure a wavefield that was ultimately initiated by the actuation of the seismic source. In this sense, the acoustic signals (or "shots") are actuated at the sources, and the receivers measure a wavefield based on the actuation of the sources.

BRIEF DESCRIPTION OF THE DRAWINGS

FIG. 3 illustrates a diagram including two shots actuated at a plurality of receivers according to one or more embodiments of the present disclosure.

FIG. 4 illustrates a diagram including five shots actuated at a plurality of receivers according to one or more embodiments of the present disclosure.

DETAILED DESCRIPTION

Figure 1A:
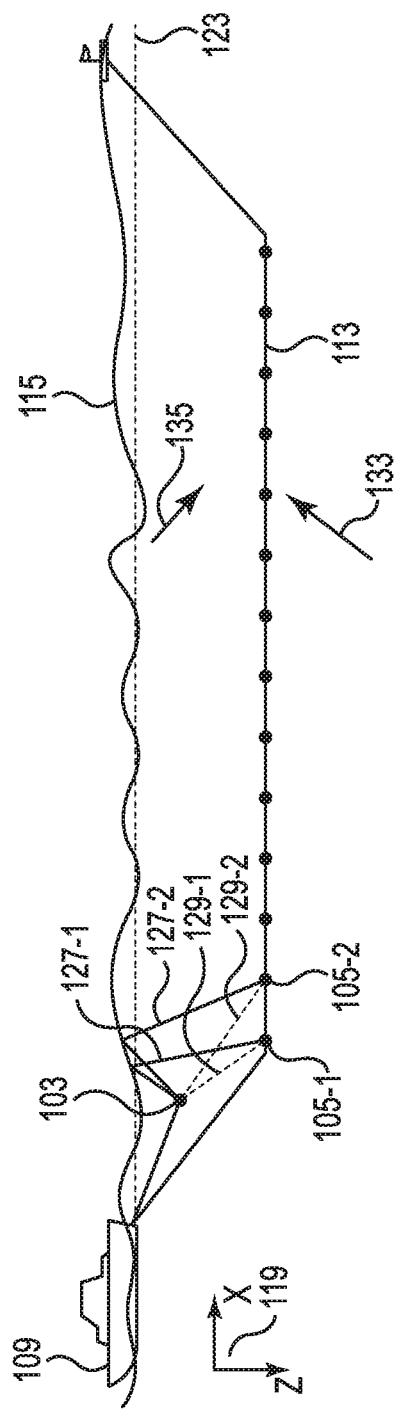
FIGS. 1A-1D illustrate coordinates and terminology associated with correction of sea surface state.

The present disclosure is related to analyzing and correcting for the effects of sea surface state in marine seismic surveying. During marine seismic surveying, sea conditions may be uncontrollable. As a result, while a vessel is moving on the sea, shooting, and recording seismic data, waves and other sea surface factors may interrupt and/or interfere with seismic recording. Embodiments of the present disclosure allow for correction or compensation of these interruptions and interferences. For instance, embodiments of the present disclosure can reduce and/or remove effects of the sea surface state variations (e.g., due to waves, swells, etc.) on up-going survey data.

It is to be understood the present disclosure is not limited to particular devices or methods, which may vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

This disclosure is related generally to the field of marine seismic surveying. For example, this disclosure may have applications in marine seismic surveying, in which one or more towed sources are used to generate wavefields, and receivers—either towed or ocean bottom—receive reflected seismic energy generated by the seismic sources. The disclosure may also have application to the analysis of the sea surface state in marine seismic surveying.

Figure 1B:
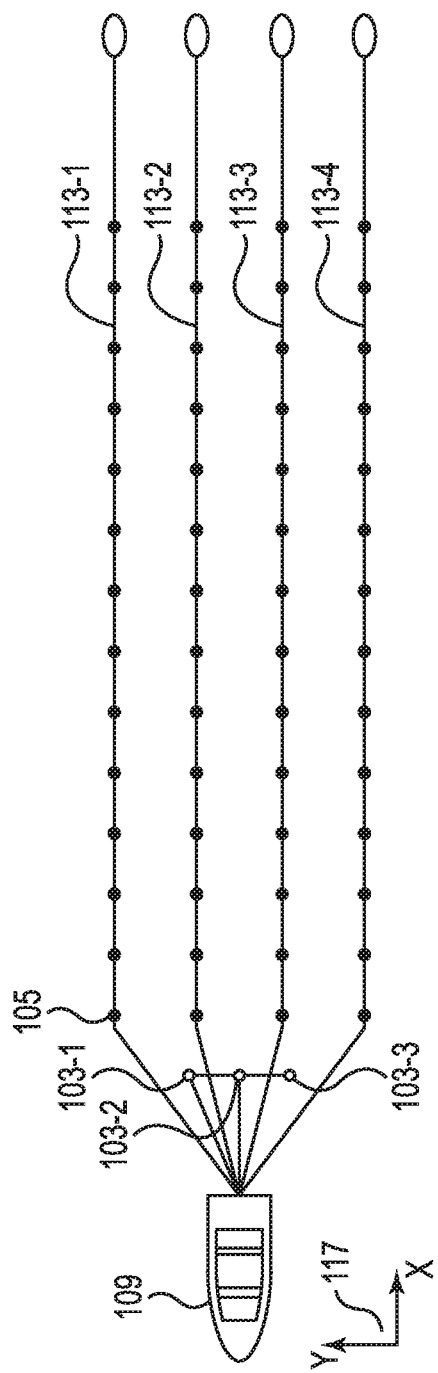

FIGS. 1A-1D illustrate coordinates and terminology associated with correction of a sea surface state. FIG. 1A illustrates an elevation or xz-plane view of an example marine seismic survey vessel 109 towing a source 103 (e.g., one or more airguns or marine vibrators) and a streamer 113 located beneath a free surface 115. In practice, source 103 and streamer 113 may be towed by the same or different vessels. FIG. 1A represents a snapshot, at an instant in time, of the undulating free surface 115 and corresponding smooth wave-like shape in the streamer 113. FIG. 1B includes xy-plane 117 and FIG. 1A includes an xz-plane 119 of the same Cartesian coordinate system used to specify coordinate locations within the fluid volume with respect to three orthogonal, spatial coordinate axes labeled x, y and z. The x coordinate uniquely specifies the position of a point in a direction parallel to the path of travel of the vessel 109 at a particular moment in time, and the y coordinate uniquely specifies the position of a point in a direction perpendicular to the x axis and substantially parallel to the free surface 115 at vessel 109 at a particular moment in time, and the z coordinate uniquely specifies the position of a point perpendicular to the xy-plane 117 at a particular moment in time. The geoid 123 is the hypothetical surface of the sea level at vessel 109 and is used to define zero elevation (i.e., z=0). Shaded disks, such as shaded disks 105-1 and 105-2, represent receivers spaced along streamer 113. Receivers 105 can include, for instance, seismic receivers and/or electromagnetic receivers, among others. Although illustrated on a towed streamer 113, receivers 105 may be located on ocean bottom cables or on nodes attached near or on the water bottom.

FIG. 1A includes an illustration of a shot and wave paths 129-1, 129-2 from the source 103 at a corresponding number of receivers 105-1, 105-2. Also illustrated at the corresponding number of receivers 105-1, 105-2 is arrival of a corresponding number of signals 127-1, 127-2 from the source 103 reflected off the free surface 115. As used herein, "source-side" can refer to some action, item, or event associated with the source (not with the receiver), affecting a source, and/or positioned near or in the same location as the source, among others. "Receiver-side" can refer to the same association of actions, items, or events with a receiver.

FIG. 1A illustrates up-going wavefield direction 133 and down-going wavefield direction 135, as will be further discussed herein.

FIG. 1B illustrates a top or xy-plane view of the marine seismic survey vessel 109 towing a source 103 with source units 103-1, 103-2, 103-3 and four separate streamers 113-1, 113-2, 113-3, 113-4 located beneath a free surface. Embodiments are not limited to three source units in a source, as a source can include more or fewer source units. Some embodiments can include 35 source units in the source. Furthermore, the source can be one-dimensional (e.g., arranged in a line as shown), two-dimensional (e.g., arranged in a rectangular grid), or three-dimensional (e.g., arranged in a cube). Source 103 may be a number of types including, but not limited to a small explosive charge, an electric spark or arc, a marine vibrator, and/or a seismic source gun, among others. Source 103 may comprise a number of source elements in a source configuration, and can, without limitation, generate a short-duration impulse. Embodiments are not limited to a particular number of streamers and can include more or fewer than are shown. Some embodiments can include 24 or more streamers. As illustrated, the streamers 113-1, 113-2, 113-3, 113-4 can be modeled as a planar horizontal acquisition surface located beneath the free surface. However in practice, the acquisition surface can be smoothly varying due to active sea currents and weather conditions. In other words, the towed streamers may also undulate as a result of dynamic conditions of the fluid. The coordinates of a particular receiver are given by (x, y, z) taking into account both the xz-plane 119 and the xy-plane 117. In some embodiments, the receiver array may vary in the z direction (e.g., receivers disposed farther from the vessel may be deeper than those closer to the vessel). Likewise, in some embodiments, one or more of the streamers may be towed at a different depth than other streamers, thereby creating an acquisition volume.

Various embodiments of the present disclosure provide methods to correct marine seismic data for sea surface state variations. The correction can occur, in some instances, at the source location, at the receiver location, or both. For instance, in marine seismic surveying, rough sea surfaces can cause amplitude and phase perturbations in acquired seismic data. Sea surface state correction in accordance with the present disclosure can compensate for at least some of these perturbations, resulting in smoothed time-varying sea surface states. In some instances, advantage may be taken of a dual-receiver streamer (e.g., streamer receivers include both hydrophones and geophones), or any multi-sensor acquisition which allows a mathematical separation of the up-going wavefields and down-going wavefields. As used herein, "up-going wavefields" can include wavefields scattered upwards from the earth or formations therein, and "down-going wavefields" can include wavefields reflected downwards from the sea surface. For instance, a down-going wavefield typically contains a direct wave, typically contains receiver-side surface multiples and water-column reverberations, while an up-going wavefield typically contains primaries and source-side ghosts and internal multiples. Since the primary reflections are contained only in the up-going wavefield, wavefield separation can be used to isolate the signal from the primary reflections.

Following the wavefield separation, up-going data may be considered as being free from any receiver-side sea surface effect. Therefore, any roughness observable on data reflected from shot point to shot point (the points at which a source is actuated) may be a side effect of the deviations in source datum caused by the sea surface state at the source location.

In some examples, time-shifts associated with the source datum deviations may be identified and corrected for. Some embodiments of the present disclosure can generate a unique estimation of the sea surface state for each source location at the moment that source is actuated.

The sea surface state (e.g., the wave height, time-derivative changes in wave height, wave frequency, and/or other sea conditions occurring at the sea surface) may vary from shot to shot in a marine seismic survey. As a consequence, source wavelet (wave-like oscillation used for signal processing) travel time may also vary from shot to shot. The effect of the sea surface state may be particularly noticeable in a receiver domain ensemble, where a single trace, which can include gathered information/data, may come from different shot points. It may manifest as a random jittery effect that could (perhaps wrongly) be qualified as "noise." In accordance with the present disclosure, assumptions can be made and a workflow may be devised that provides a surface-consistent static correction. Although FIGS. 1A and 2A illustrate horizontal or straight-line towing, examples of the present disclosure may include circular towing and/or spiral towing, among others. Additionally, although FIGS. 1A and 1B illustrate a single vessel, a plurality of vessels may be present, with some or all of the vessels towing streamers and some or all of the vessels towing sources and actuating shots. The streamers may be towed in different directions, depths, and/or angles, among other differences. Receivers may be located on streamers, ocean bottom cables, or on nodes located on or near the water bottom.

Figure 1C:
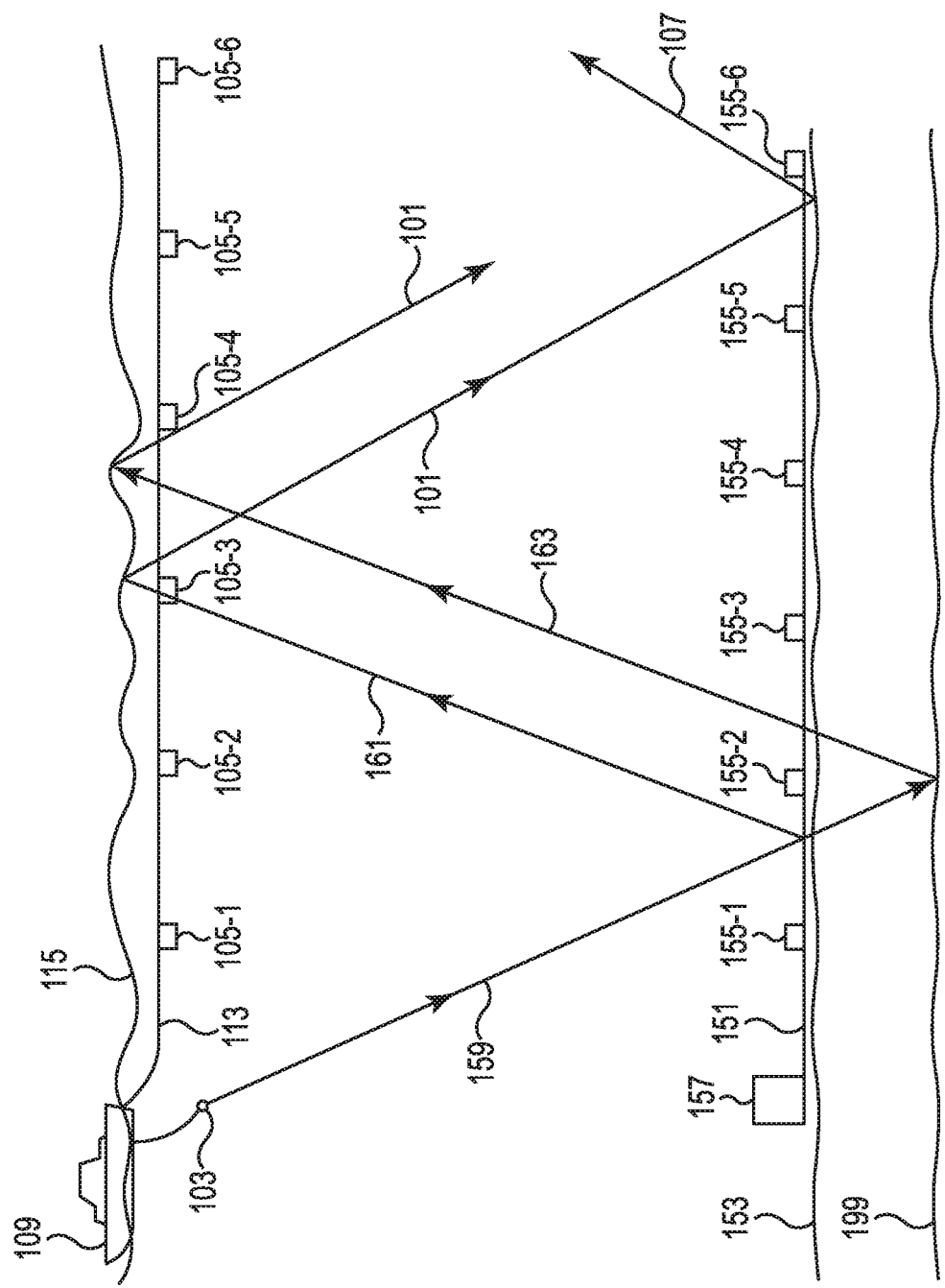

FIG. 1C illustrates an example technique for acquiring seismic data that may be used in correction of sea surface state in one or more embodiments of the present disclosure. The example illustrated in FIG. 1C is two-dimensional, meaning that the technique is related to data acquired using a single seismic streamer 113 or an ocean bottom cable 131. Examples of the present disclosure Call also be used with three-dimensional acquisition techniques, in which more than one seismic source and/or laterally spaced streamers and/or ocean bottom cables are used to acquire seismic data. Examples of the present disclosure can also be used with receivers located on nodes near or on the water bottom 153.

As illustrated in FIG. 1C, vessel 109 can tow a source 103 that can be actuated at selected times. In some examples, a streamer 113 is also towed by the vessel 109. The streamer 113 includes receivers 105-1, . . . , 105-6 at spaced positions along the cable 113. Each receiver can he responsive, for example, to the pressure in the water or to changes in pressure, such as, for instance, changes in pressure with respect to time. Examples of the present disclosure can also be used with receivers that are sensitive to particle motion or changes in particle motion.

In some embodiments, an ocean bottom cable (OBC) 151 can be deployed on the water bottom 153. The OBC 151 can include, for instance, receivers 155-1. 155-6 spaced along OBC 151. Signals generated by the receivers 155-1, . . . , 155-6 can be recorded by a. recording unit 157 for later retrieval and processing. In some examples, both streamers and OBCs can be used to record signals to be processed according to the present disclosure. In some examples, in addition to or in place of, receivers located on nodes near or on the water bottom 153 may be used to record signals to be processed according to the present disclosure.

When source 103, is actuated, acoustic energy travels downwardly, at 159. Some of the downwardly traveling energy 159 penetrates the water bottom 153 and reaches a subsurface layer boundary 199 Acoustic energy can be reflected from the layer boundary 199, whereupon the reflected energy travels upwardly, as shown generally at 163. Acoustic energy can also be reflected from the water bottom 153, whereupon the reflected energy travels upwardly, as shown generally at 161. The upwardly traveling acoustic energy 161, 163 can be detected by the receivers 105-1, . . . , 105-6 on the streamer 113 (or the receivers 155-1, . . . , 155-6 on the OBC 151 on the water bottom 153 if an OBC is used). The upwardly traveling energy 161, 163 can reflect from the water surface 115, whereupon the energy travels downwardly again, as shown at 101. The water surface reflected energy 101 can be detected by the receivers 105-1, . . . , 105-6, (and/or 155-1, . . . , 155-6) resulting in a ghost signal. The water surface reflected energy 101 also may be reflected from the water bottom 153, and becomes upwardly traveling energy, shown generally at 107. Further, acoustic energy can reflect from the water surface (down-going energy 101) and can again reflect from the water bottom (up-going energy 107) a plurality of times, resulting in water-layer multiple reflections.

As a result of all the foregoing acoustic energy interactions with the water and the structures below the water the acoustic energy detected by the receivers 105-1, . . . , 105-6, (and/or 155-1, . . . , 155-6) referred to as a "total wavefield", includes both upwardly traveling energy ("up-going wavefield") and downwardly traveling energy ("down-going wavefield"), The up-going and down-going wavefields include components resulting from subsurface reflectors, such as boundary 199, and from water surface and water bottom reflections.

Figure 1D:
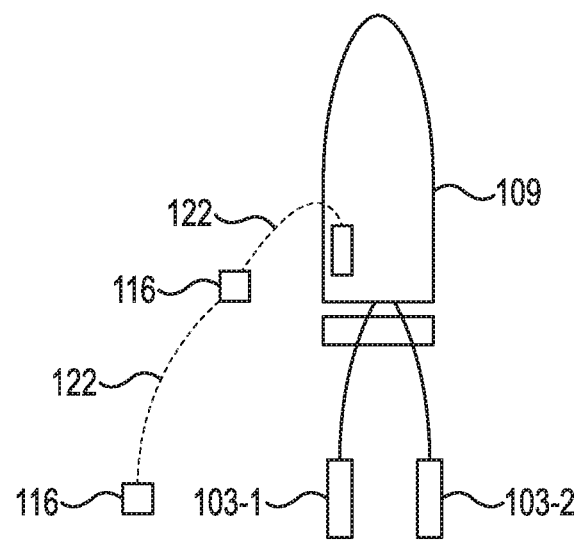

FIG. 1D illustrates an example nodal receiver geophysical survey system including a vessel 109 that moves along the surface of a body of water such as a lake or the sea. Data acquisition in accordance with one or more embodiments of the present disclosure can be performed via a nodal receiver geophysical survey system as illustrated in FIG. 1D. Sources 103-1 and 103-2 can be actuated, and the resultant wavefield can be detected with nodal receivers 116 positioned on the water bottom.

As will be discussed further herein, a method for correction of a sea surface state can include receiving geophysical data from a seismic survey, wherein the seismic survey utilizes a plurality of receivers disposed in a body of water, and at least one source in the body of water, actuated at a plurality of shot points. The method can also include identifying, in the geophysical data, a wavefield based on the actuation of the at least one source, and determining, based on the identified wavefield, a sea surface state at the at least one source at one of the plurality of shot points. In some examples, determining the sea surface state can include separating up-going portions of the measured wavefield from down-going portions of the measured wavefield, determining source-side effects in the up-going wavefield, cross-correlating constant receiver and constant channel ensembles, and statistically filtering and extracting a surface consistent time correction to apply to the plurality of shot points based on the cross-correlation.

Figure 2:
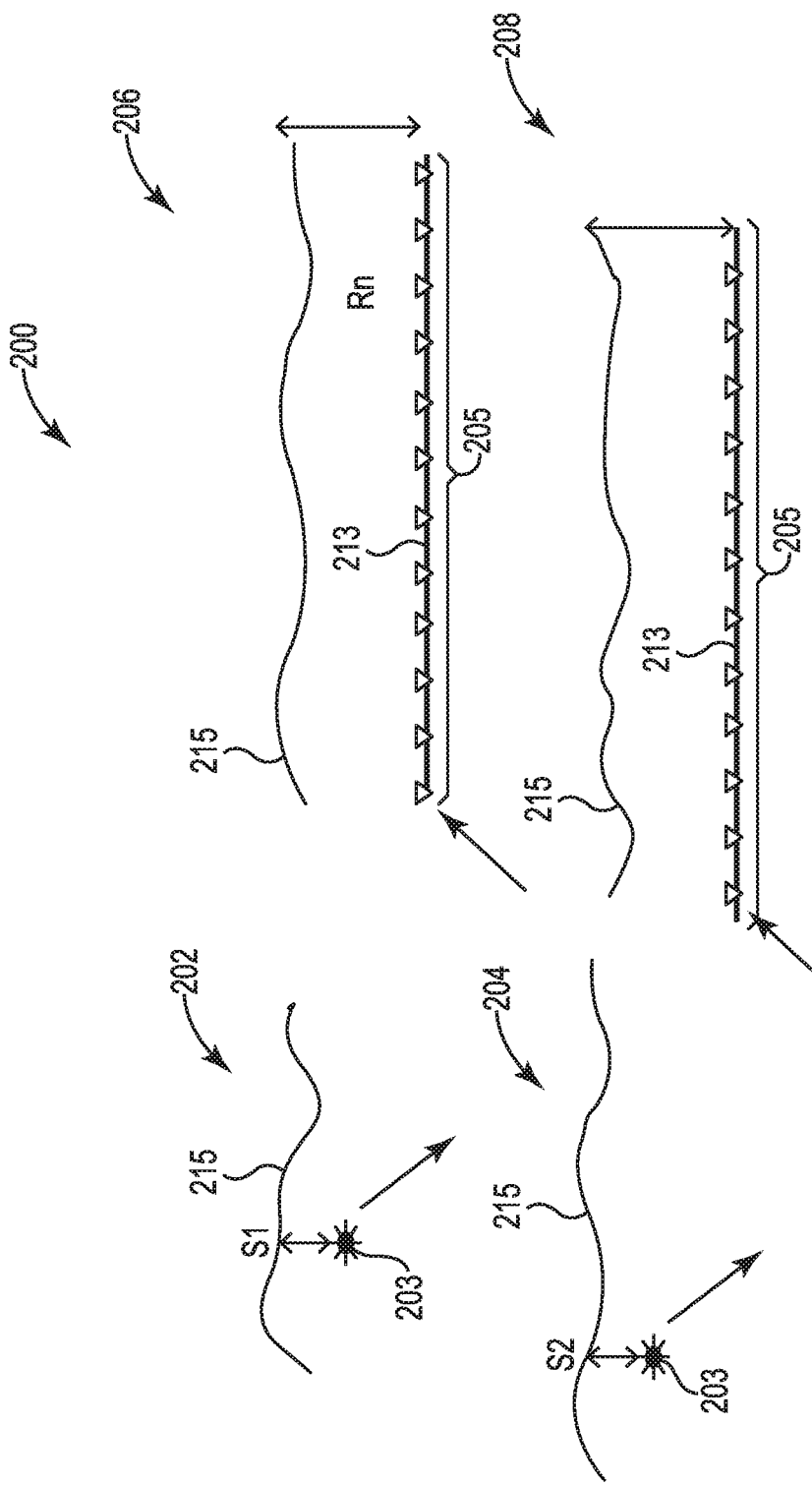
FIG. 2 illustrates a diagram including two shots actuated at a plurality of receivers according to one or more embodiments of the present disclosure.

FIG. 2 illustrates a diagram 200 including two shots actuated at a plurality of receivers according to one or more embodiments of the present disclosure. FIG. 2 illustrates an example in which a source 203 is actuated at a set of receivers Rn 205 at different times t1 and t2, for instance at 202 and 204, respectively. The two shots are actuated from the same source 203, but at different times t1 and t2. Source 203 moves from shot point S1 at time t1 (at 202) to shot point S2 at time t2 (at 204). As illustrated in FIG. 2, the shift in the position of the receivers 205 from right to left and from time t1 (at 202) to time t2 (at 204) can indicate the passage of the streamer 213 through the water from right to left as time advances from t1 to t2. Seismic source 203 can represent an appropriate submerged seismic source, which may be activated to generate an acoustic wavefield. Source 203 may be towed by a vessel or otherwise disposed in the marine environment.

Because of simultaneous recording of the plurality of receivers Rn, whatever the sea condition, there may be some continuity between traces within a given shot point (e.g., shot point S1 or S2). Reciprocally, for a given receiver position, traces may be coming from different shot points shot at different times, which therefore may express sea surface state variation at each shooting time. In the example illustrated in FIG. 2, source 203 may be approximately 7 meters from sea surface 215 at each shot point S1 and S2, though embodiments are not limited to this distance or to identical depths at shot point S1 and S2.

At 206, the plurality of receivers Rn 205 simultaneously record the wavefield resulting from source 203 actuating at shot point S1 at time t1. In the example illustrated in FIG. 2, the distance between the receivers Rn 205 and the sea surface 215 is approximately 15 meters at the distal end of streamer 213, though embodiments are not limited to this distance or to each of the receivers Rn 205 being at identical depths. At 208, the plurality of receivers Rn 205 simultaneously record the wavefield resulting from source 203 actuation at shot point S2 at time t2 with a distance of 15 m between the distal end of streamer 213 and the sea surface 215, however, embodiments are not limited to this distance, to each of the receivers Rn 205 being at identical depths, or to the same depth of the distal end of streamer 213 when recording wavefields from actuations of the source 203 at times t1 and t2.

The measured wavefield may include both up-going and down-going portions. These portions can be separated, and source-side effects in the up-going portion can be determined. An example of wave separation, also known as decomposition, is described in United States Patent Application Publication Number 2014/0016436, which is hereby incorporated by reference. For instance, a sea surface state variation as it relates to the source side can be determined. Cross-correlations, as will be discussed further herein, can be performed between constant receiver and constant channel ensembles. A surface time correction to apply to the plurality of shot points can be statistically filtered and extracted based on the source-side effects and cross-correlations. For example, this surface time correction can correct for sea surface state variations, making for more accurate, smoother sea surface state data.

Figure 5:
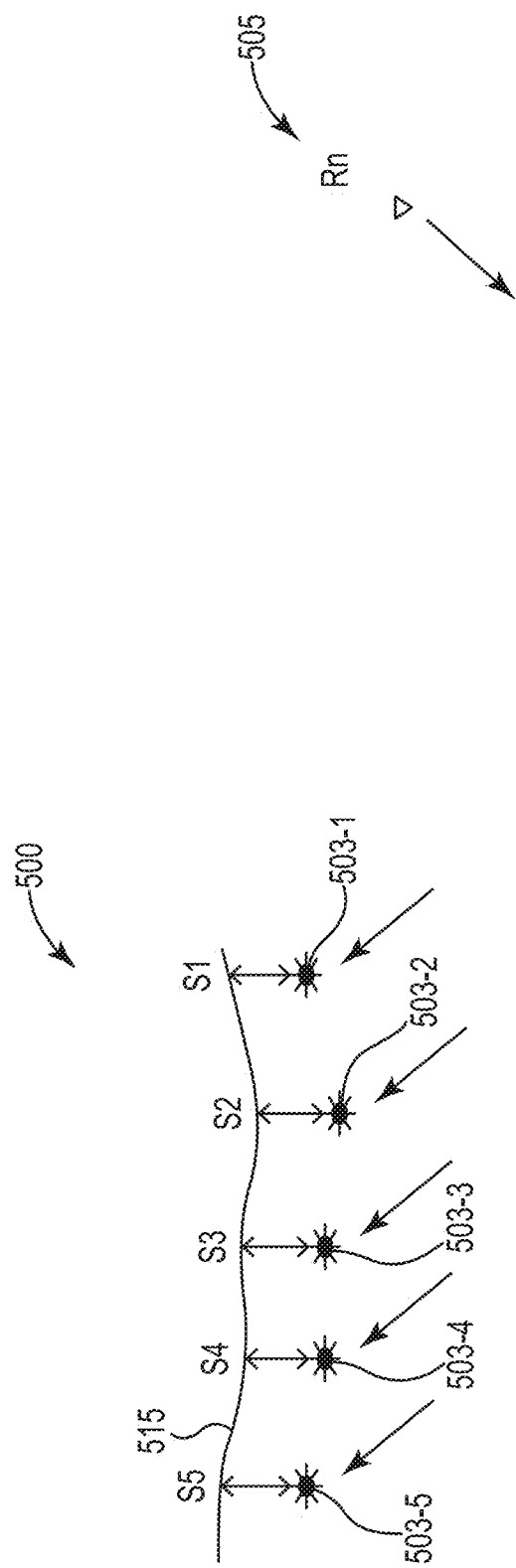
FIG. 5 illustrates a diagram including five shots actuated at a plurality of receivers according to one or more embodiments of the present disclosure.

FIG. 3 illustrates a diagram 300 including two shots actuated at a plurality of receivers according to one or more embodiments of the present disclosure. In the example the actuated shots can include a series of shots actuated at different times from a single source. For instance, the shots can be actuated at nearly the same time and/or within a particular time interval. FIG. 3 illustrates an example in which two shots, occurring at shot points S1 and S2, are actuated from source units 303-1 and 303-2, respectively, at a plurality of receivers Rn 305. While only one receiver is shown in FIG. 3, Rn 305 can represent a plurality of receivers, and the plurality of receivers may be disposed on one or more streamers, one or more ocean bottom cables, a plurality of nodes near or on the water bottom, or any combination thereof. As noted with respect to FIG. 2, because of the simultaneous recording of the plurality of receivers Rn 305, whatever the sea condition, there may be some continuity between traces within a given shot point (e.g., shot point S1 or S2). Reciprocally, for a given receiver position, all the traces may be coming from different shot points shot at different times, which therefore may express sea surface state variation at each shooting time. The arrows as illustrated in FIGS. 3-5 are not meant to be directional. Rather FIGS. 3-5 illustrate that a given receiver location Rn 305 can record data initiated from consecutive source locations (e.g., at shot points S1,. . ., Sn) for which the sea surface state may be unpredictable. In the example illustrated in FIG. 3, each source unit 303-1, 303-2 may be a particular distance 312-1, 312-2 away from a sea surface 315. In some examples, these distances 312-1- and 312-2 can be the same, however, they are not required to be the same.

FIG. 4 illustrates a diagram 400 including five shots actuated at a plurality of receivers according to one or more embodiments of the present disclosure. In the example the actuated shots can include a series of shots actuated at different times from a single source. For instance, the shots can be actuated at nearly the same time and/or within a particular time interval. FIG. 4 illustrates an example in which five shots, occurring at shot points S1, S2, S3, S4 and S5 are actuated from source units 403-1, 403-2, 403-3, 403-4, and 403-5, respectively at a plurality of receivers Rn 405. While only one receiver is shown in FIG. 4, Rn 405 can represent a plurality of receivers, and the plurality of receivers may be disposed on one or more streamers, one or more ocean bottom cables, a plurality of nodes near or on the water bottom, or any combination thereof The plurality of receivers Rn 405 may simultaneously record a wavefield based on the five shots at a particular time. Similar to FIGS. 2 and 3, because of simultaneous recording of the plurality of receivers Rn 405, whatever the sea condition, there may be some continuity between traces at different receivers from a given shot point. Reciprocally, for a given receiver position, traces may be coming from different shot points shot at different times, which therefore may express sea surface state variation at each shooting time.

As illustrated in FIG. 4, consecutive shot points S1, S2, S3, S4, and S5 are shot at a regular time interval during which a vessel has moved up and down on the sea surface 415; the state of sea surface 415 is illustrated for each of the shot points S1, S2, S3, S4, and S5 by sea surface 415 shown as multiple wavy lines. In the example illustrated in FIG. 4, an assumption can be made that a distance 412-1, 412-2, 412-3, 412-3, 412-4, 412-5 of a source unit 403-1, 403-2, 403-4, 403-4, 403-5 away from a sea surface 415 remains stable, an absolute height of the source unit may differ from shot to shot. In the example illustrated in FIG. 4, each source unit may be approximately 7 meters from sea surface 415, though embodiments are not limited to this distance or that each source unit is at the same depth.

FIG. 5 illustrates a diagram 500 including five shots actuated at a plurality of receivers according to one or more embodiments of the present disclosure. In the example the actuated shots can include a series of shots actuated at different times from a single source. For instance, the shots can be actuated at nearly the same time and/or within a particular time interval. Diagram 500 includes five shots occurring at shot points S1, S2, S3, S4, and S5 actuated at a plurality of receivers Rn 505 from source units 503-1, 503-2, 503-4, and 503-5, respectively. While only one receiver is shown in FIG. 5, Rn 505 can represent a plurality of receivers, and the plurality of receivers may be disposed on one or more streamers, one or more ocean bottom cables, a plurality of nodes near or on the water bottom, or any combination thereof. The plurality of receivers Rn 505 can be simultaneously recording wavefields resulting from shots at shot points S1, . . . , S5 at a particular time. Similar to FIGS. 2-4, because of the simultaneous recording, whatever the sea condition, there may be some continuity between traces within a given shot point. Reciprocally, for a given receiver position, traces may be coming from different shot points shot at different times, which therefore may express sea surface state variation at each shooting time. However, in contrast to FIG. 4, FIG. 5 illustrates a culmination of the sea surface 515 and its state above the consecutive shot points S1, S2, S3, S4, and S5. For instance, as illustrated in FIG. 5, if the sea surface 515 is not flat, shot points S1, S2, S3, S4, and S5 are not aligned on a horizontal line. This may result in a vessel travel time difference from shot point to shot point as the sea surface state is always changing.

Assuming the distance from a source to the sea surface remains relatively stable (within about a 10% variation), the variations in the sea surface state at the source may cause the absolute height of a source to differ from shot to shot. Within a shot point, all traces may express a continuous sea surface state. Within a receiver gather, all the traces may come from different source positions shot at different times and sea surface state variation. The demonstrated effect may be expressed as a random time delay between traces.

Figure 6:
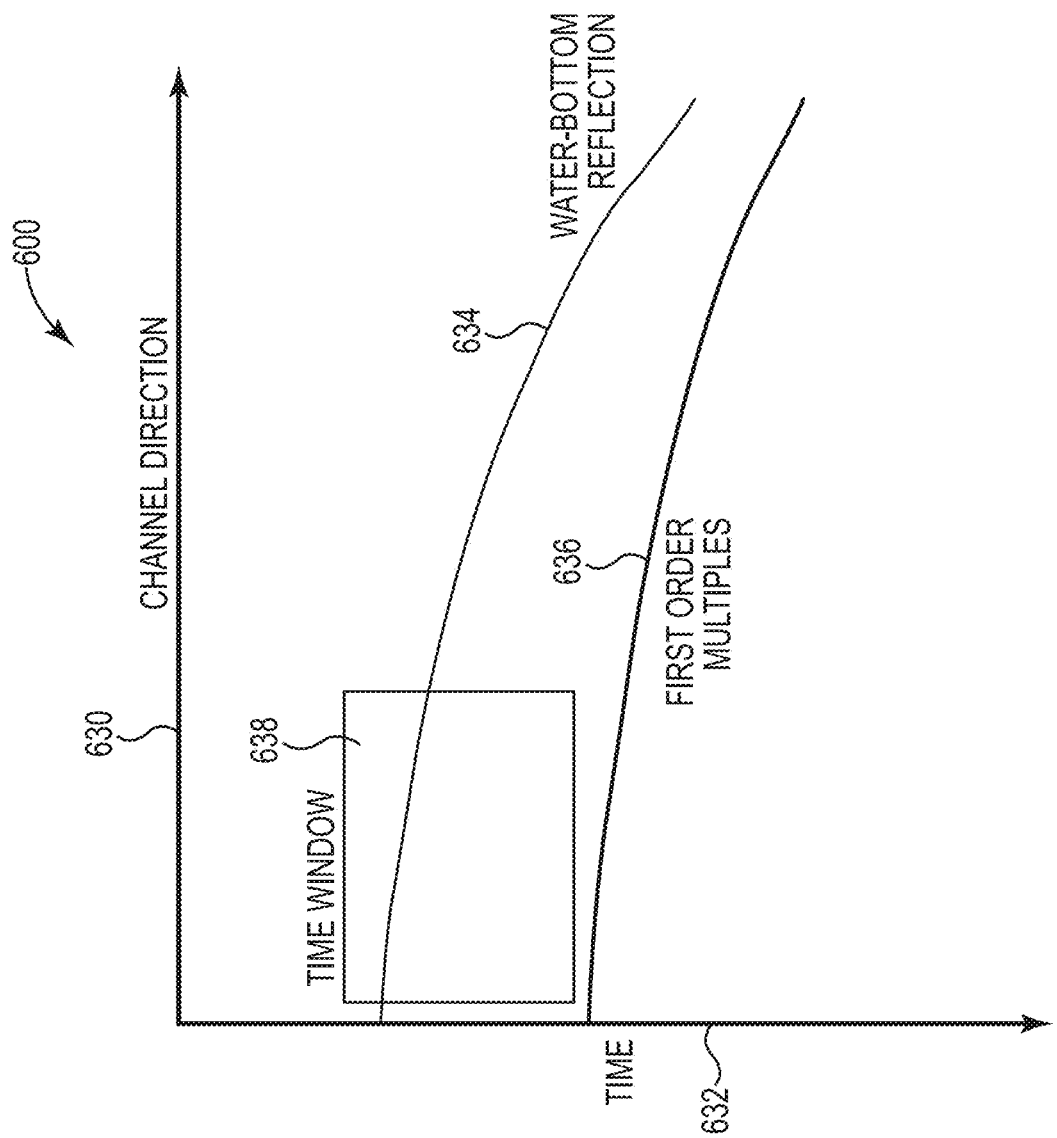
FIG. 6 illustrates a diagram illustrating the collection of data according to one or more embodiments of the present disclosure.

FIG. 6 illustrates a diagram 600 illustrating the collection of data according to one or more embodiments of the present disclosure. The embodiment illustrated in FIG. 6 can, in some examples, be applied only to up-going data, and may be applied after de-noise and wavefield separation of up-going and down-going data processes have been applied in a shot point domain. As a vessel moves in a particular direction, for instance channel direction 630, over time 632, data can be collected. Choosing where and during what time window to collect this data can aid in correction and/or compensation for sea surface state variations. For instance, a same number of nearest channels can be chosen for all sequential shot points. In some examples of the present disclosure, a channel can include data recorded from a receiver at one location on a streamer. A channel can also refer to, for instance, the actual recording device inserted into a streamer at a regular distance interval (e.g., 12.5 meters). For example, a streamer may contain hundreds of channels. An example time window 638 can be designed starting above the water bottom (e.g., above first order multiple 636, taking into account water-bottom reflection 634) and finishing at twice the water bottom. In the example illustrated in FIG. 6, this bottom period may include, for instance, a maximum of 500 ms. As will be discussed further herein, after the time window design to correct for the sea surface effect on the receiver side and the source side, the constant receiver and constant channel ensembles can be cross-correlated, gathered, and surface consistent time correction can be statistically filtered and extracted to apply to every shot point.

As used herein, "constant receiver" can refer to data recorded from a particular location in the water. A constant receiver can include data that would have been recorded from the particular location if there was a stationary receiver placed at that particular location; however, a stationary receiver may not be possible in streamer-based acquisition due to the streamer constantly moving. In response, in accordance with the present disclosure, a constant receiver can be constructed by taking data recorded from one channel when it was in a first location, and combining it with data recorded from the next channel, for instance, when it had moved to the particular, desired location. This can be performed for all channels on the streamer.

Figure 7:
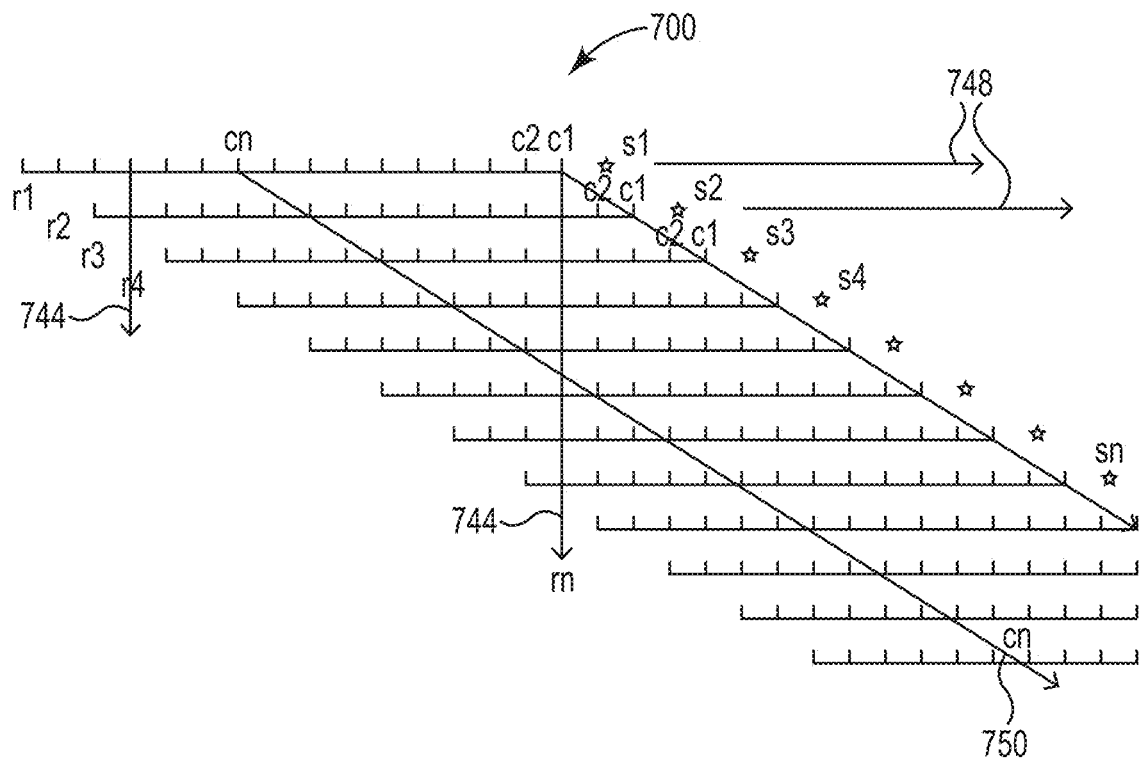
FIG. 7 illustrates a diagram including the use of sources, channels, and receivers, along with various cross-correlations according to one or more embodiments of the present disclosure.

In some examples, a constant receiver can be considered a fixed point in space. On a constant receiver record, data collected can include all data that has been recorded from one location. A "constant channel", as used herein, can represent that data being recorded from the same physical receiver, i.e., a fixed position on the streamer. Because the streamer is constantly moving through the water, this can represent data from a number of different locations. FIG. 7 illustrates a diagram 700 including the use of sources, channels, and receivers, along with various cross-correlations according to one or more embodiments of the present disclosure. Diagram 700 includes the use of sources at shot points S1 to Sn, channels c1 to cn, and receivers r1 to m, along with various cross-correlations. In the example illustrated in FIG. 7, a vessel towing a source may be thought of as moving toward the right side of FIG. 7 in shot point direction 748, such that each horizontal line represents a shot point S1, S2, Sn (e.g., the vessel is shooting at regular increments). In the illustrated embodiment, the vessel also tows a streamer on which a plurality of receivers is located. A constant receiver direction is illustrated at 742 and 744, and the constant channel direction (assuming a given receiver is located at constant location along the streamer) is illustrated at 750. In some examples, the constant channel may change from source-to-source based on how far the vessel has moved.

In the example illustrated in FIG. 7, each line labeled r1, r2, . . . , rn can represent a receiver position, and each vertical dash labeled c1, c2, . . . , cn can represent a channel position (e.g., first channel, second channel, etc.). As illustrated in FIG. 7, constant receiver direction 744 and constant channel direction 750 are used as an explanation of diagram 700. For instance, diagram 700 can represent recording of data from shots at a plurality of shot points S1, S2, . . . , Sn and a plurality of channels c1, . . . , cn for a plurality of different receiver positions r1, r2, . . . , rn. Diagram 700 can be used to aid in understanding a layout of an acquisition, for instance. However, diagram 700 is schematized to represent acquisition of the data, but is not a drawn picture of the acquisition. Shot point direction 748 can indicate a progression of data acquisition from shot point S1 through shot point S2, through shot point S3, and so on through shot point Sn. Shot point direction 748 can be used to indicate the direction in which to read diagram 700, for instance.

Figure 11:
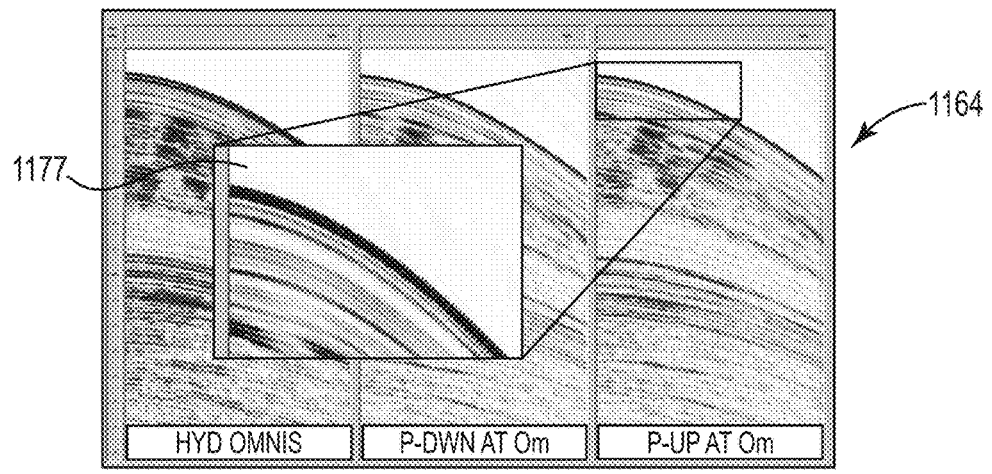
FIG. 11 illustrates an example shot point gather according to one or more embodiments of the present disclosure.

Information/data regarding consecutive shot points S1, S2, . . . , Sn can be gathered at each receiver and channel position. Each trace can be embedded, as illustrated in FIG. 11, and each trace can include information/data about the sea surface state at sources associated with consecutive shot points S1, S2, . . . , Sn. Using cross-correlation of the data, the effect of the sea above a source can be reduced or eliminated. For instance, because there may not be a large distance between each source unit (e.g., between shot points S1 and S2), a large difference in a wavefield may not be observed or expected; however, using cross-correlation among all the data (receivers, shot points/sources, channels), sea surface state correction is possible. In some examples, as a result of this cross-correlation, a sea surface state may appear flat, even though the vessel and sources are moving up and down.

For instance, up-going wavefield data and source-side data can be collected, and used to calculate a cross-correlation within an ensemble of source units (shot points), channels, and receivers. These cross-correlations can be used to correct the sea surface state. Examples of the present disclosure can decompose the sea surface effect on a receiver side and a source side of a towed streamer and correct for the sea surface effect on the receiver side and the source side based on the decomposition.

For instance, cross-correlation AS at a constant channel between consecutive shot points (S1*S2), (S2*S3), . . . , (Sn−1*Sn) can be determined. In some instances, AS may refer to a change in sea surface state relative to a constant channel. For example, channel 1 of source unit 1 can be cross-correlated with channel 1 of source unit 2, etc. The resulting change in time values may be normal move out (NMO) independent, in other words, independent of an effect that the offset distance between a seismic source and a receiver has on the arrival time of a reflection in the form of an increase of time with offset. The resulting change in time values may characterize two terms and be determined as a function of: G, which varies smoothly (indicative of the geology of the area from which the data was collector); and Rd which is random (indicative of the sea surface state variation). Accordingly:

$$\Delta S = f(G + Rd).$$

A cross-correlation at a constant channel within a shot point between consecutive channels (c1*c2), (c2*c3), . . . , (cn−1*cn) can be determined. The resulting change in time values may be characterized by two terms and be determined as a function of: V, which varies smoothly with increasing offset (indicative of the velocity); and G, which varies smoothly (indicative of the geology). Accordingly:

$$\Delta C = f(V + G).$$

A cross-correlation at a constant receiver between consecutive shot points, (c1*c3), (c3*c5), . . . , (cn−3*cn−1) and (c2*c4), (c4*c6), . . . , (cn−2*cn) can also be performed. The resulting change in time values may be characterized by three terms and be determined as a function of: V, which varies smoothly with increasing offset (indicative of the velocity); G, which varies smoothly (indicative of the geology); and Rd that is random (indicative of the sea surface state variation). Accordingly:

$$\Delta R2n = f(V + G + Rd) \text{ and } \Delta R2n+1 = f(V + G + Rd).$$

There may a certain amount of redundancy between the cross-correlations. This redundancy can be used to reduce uncertainty in sea surface state variation and separate the effects of the geology and NMO from the randomness that characterizes the sea surface state variation.

For instance, in order to compute surface consistent statics at source locations with a-priori knowledge that the static values at receiver locations equal zero, the following can be performed:

For instance, in order to compute surface consistent statics at source locations with a-priori knowledge that the static values at receiver locations equal zero, the following can be performed:

(1) Derive $\Delta S = f(G + Rd)$. Isolate Rd and G;
(2) Derive $\Delta C = f(V + G)$. Estimate V+G by keeping a coherent term; and Derive $\Delta R2n = f(V + G + Rd)$ and $\Delta R2n+1 = f(V + G + Rd)$. Remove Rd and V+G as computed in (1) and (2). Isolate a residual and iterate.

Figure 8:
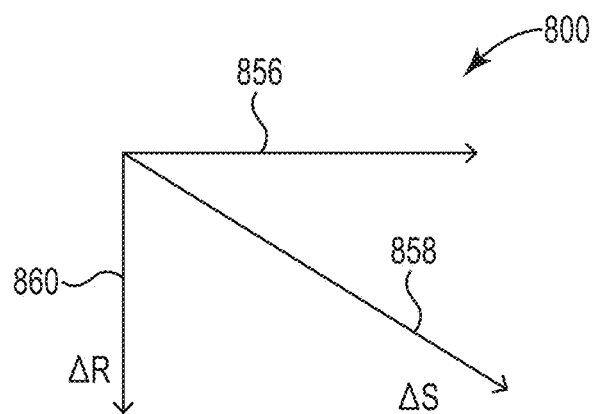
FIG. 8 illustrates a diagram relating to shot point direction, constant receiver direction, and constant channel direction according to one or more example embodiments of the present disclosure.

FIG. 8 illustrates a diagram 800 relating to shot point direction, constant receiver direction, and constant channel direction according to one or more example embodiments of the present disclosure FIG. 8 is an example of elaboration of shot point direction, constant channel direction, and constant receiver direction as described with reference to FIG. 7. For instance, by reordering acquired data, the data can be placed into a particular order, which can include what would have been obtained had the receivers been fixed in space, rather than being towed behind a vessel. Diagram 854 includes an example relating to shot point direction 856, constant receiver direction 860, and constant channel direction 858. In the example illustrated in FIG. 8, as discussed with reference to FIG. 6, AS can include a cross-correlation at a constant channel between consecutive shot points. Also as discussed with reference to FIG. 6, $\Delta C$ can include a cross-correlation at a constant channel within a shot point between consecutive channels. Finally, as discussed with reference to FIG. 6, $\Delta R2n$ can include a cross-correlation within a constant receiver between consecutive shot points. FIG. 8 illustrates the constant receiver direction 860, constant channel direction 858, and shot point direction 856, as used in example embodiments. Cross-correlations between these constant receiver and constant channel ensembles can aid in correction of sea surface state. As noted above with respect to FIG. 6, redundancy between the cross-correlations can be used to reduce variations and separate the effects of the geology and NMO from the randomness that characterizes the sea surface state variation.

In a number of embodiments, sea surface state correction can be applied to a data set in order to demonstrate the feasibility of computing and correcting for sea statics on the source side. For example, the data examples presented in FIGS. 9-14 can include hydrophone, up-going, and down-going at 0 m in both shot and 2D receiver domains. The 2D receiver gathers are presented with and without linear move out (LMO) to determine the effect of the applied statics on the data. Hydrophone-only streamers record the combination of the up-going and down-going wavefields, and may be thus contaminated with unwanted "ghost" reflections from all target depths.

Figure 9:
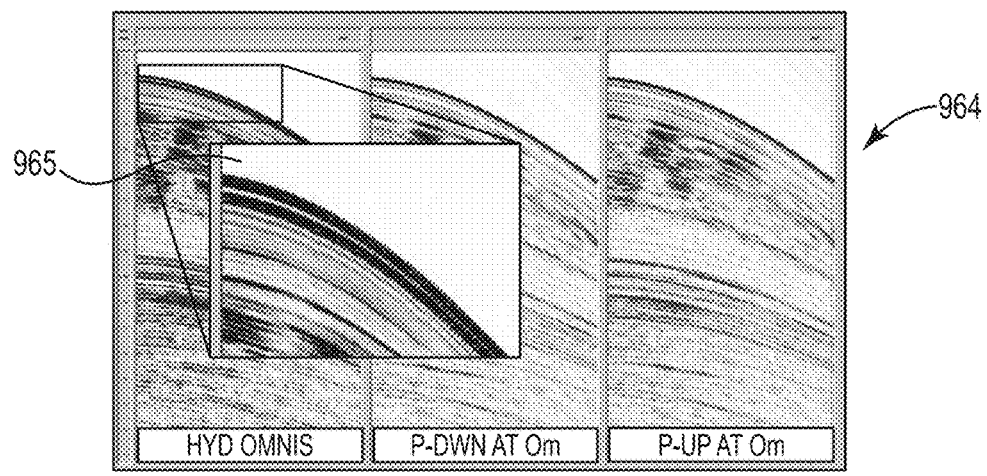
FIG. 9 illustrates an example shot point gather according to one or more embodiments of the present disclosure.

FIG. 9 illustrates an example shot point gather 964 according to one or more embodiments of the present disclosure. In some examples, example shot point gather 964 includes data collected via hydrophone-only streamers. As illustrated at 965, receiver-side ghosts are instable on the shot point data.

Figure 10:
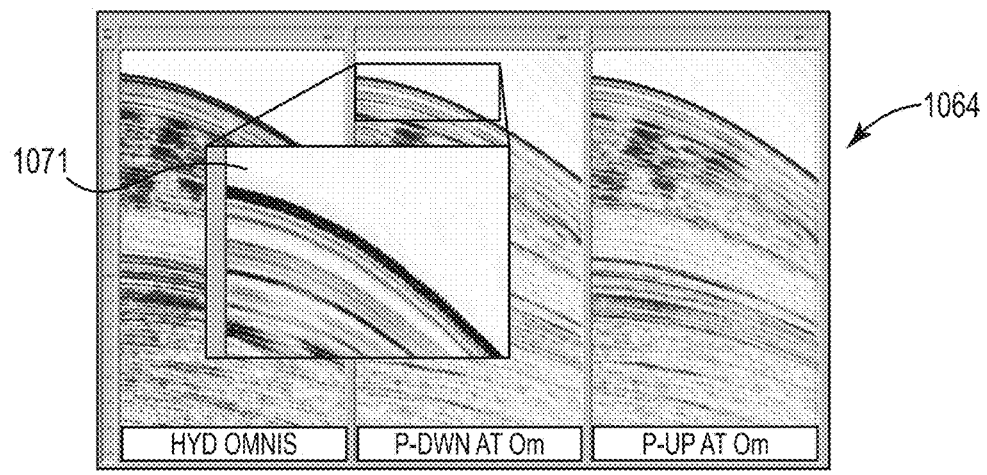
FIG. 10 illustrates an example shot point gather according to one or more embodiments of the present disclosure.

FIG. 10 illustrates an example shot point gather 1064 according to one or more embodiments of the present disclosure, and can, for example include down-going data. As illustrated at 1071, the down-going data contains information related to the sea surface state over the recording streamer.

FIG. 11 illustrates an example shot point gather 1164 according to one or more embodiments of the present disclosure. As illustrated at 1177, the sea surface state over the recording streamer does not affect the quality of the up-going on the shot point data. As such, in a number of embodiments, only up-going data is utilized, along with only data on the source side, resulting in a compensation, also known as smoothing out of data, for sea surface state variation.

Figure 12:
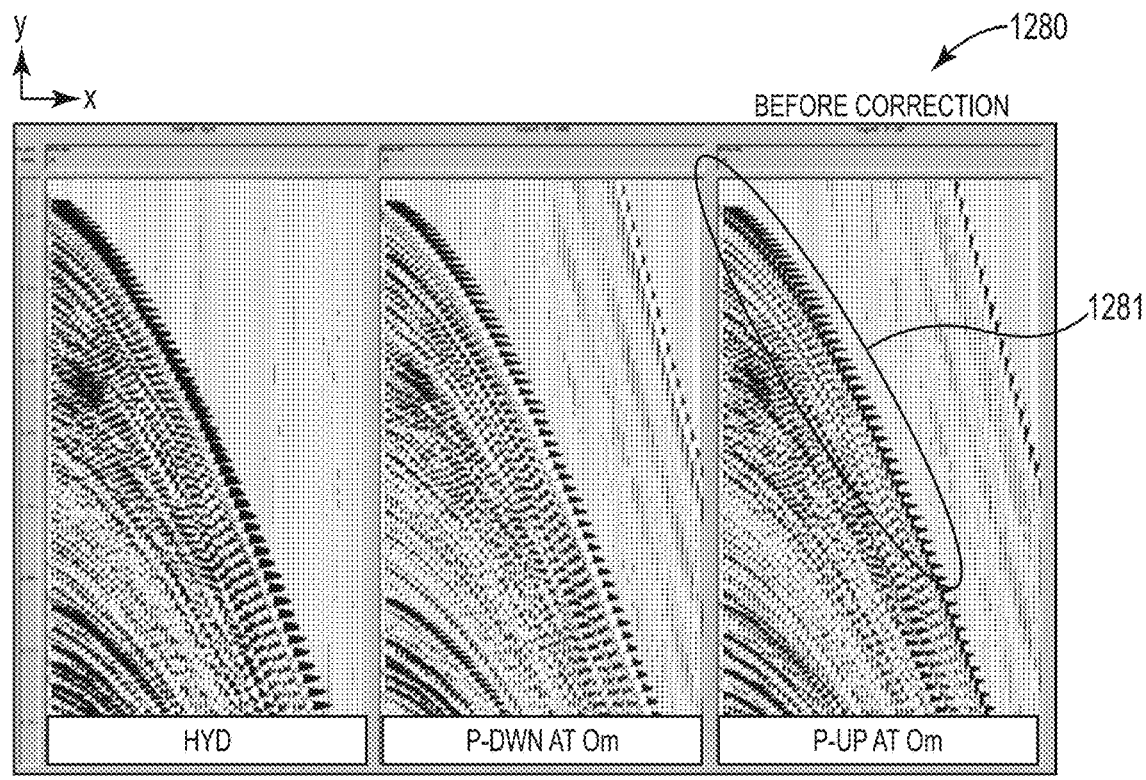
FIG. 12 illustrates an example two-dimensional (2D) receiver gather before correction of sea surface state according to one or more embodiments of the present disclosure.

FIG. 12 illustrates an example two-dimensional (2D) receiver gather 1280 before correction of sea surface state according to one or more embodiments of the present disclosure. In the example illustrated in FIG. 12, the x-axis can represent a vessel's travel, and the y-axis can represent a change in data gathered. FIG. 12 can illustrate data points collected over some time period, also known as a "snapshot". For instance, each trace can be collected at a different shot point such that the trace changes from one shot point to another. Looking at the up-going data at 0 m, the interface data 1281 at the sea bed indicates a first surface status before a correction or compensation for sea surface state variation.

This may be smoothed (as will be discussed with respect to FIG. 15) in accordance with the present disclosure. As used herein, an "interface" can include a common surface separating two media. For instance, different properties of the media can result in partial reflection of source energy back towards the receivers.

Figure 13:
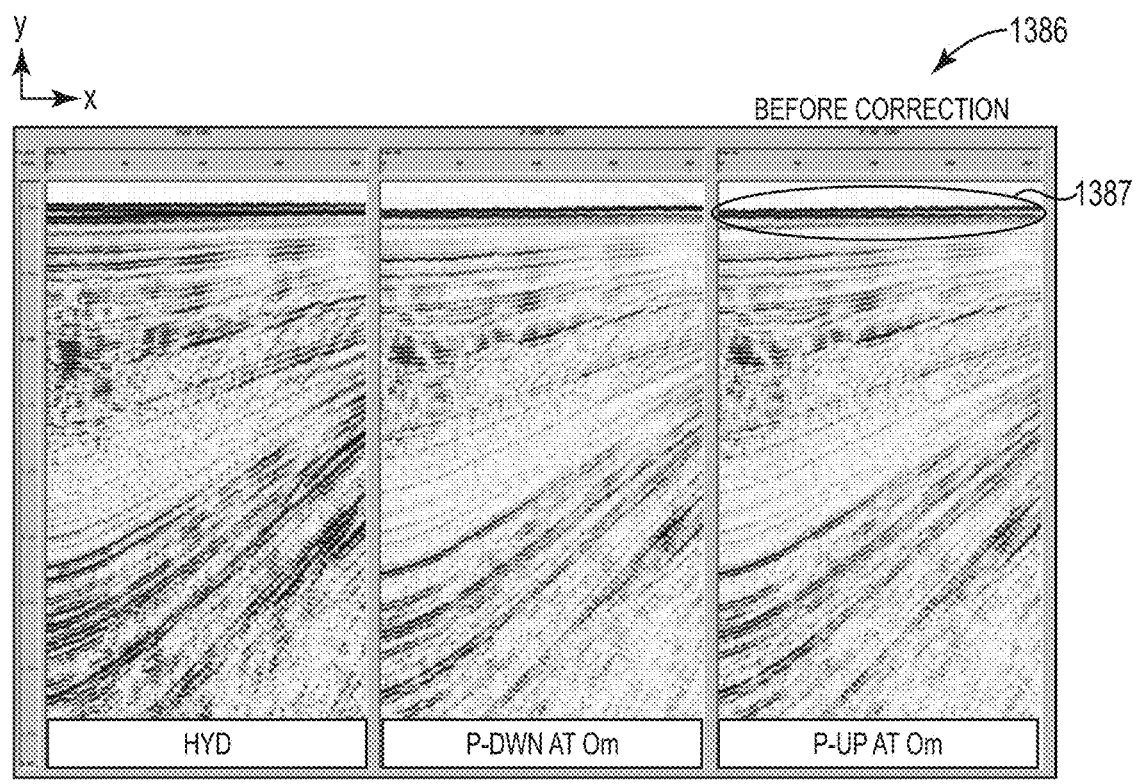
FIG. 13 illustrates an example 2D receiver gather plus linear move out (LMO) before correction of sea surface state according to one or more embodiments of the present disclosure.

FIG. 13 illustrates an example 2D receiver gather 1386 plus LMO before correction of sea surface state according to one or more embodiments of the present disclosure. In the example illustrated in FIG. 13, the x-axis can represent a vessel's travel, and the y-axis can represent a change in data gathered. FIG. 13 can illustrate data points collected over some time period, and each trace can be collected at a different shot point (e.g., changes from one shot point to another). Looking at the up-going data at 0 m, the interface data 1387 indicates an interface status before a correction or compensation for sea surface state variation. This may be smoothed (as will be discussed with respect to FIG. 14) in accordance with the present disclosure.

Figure 14:
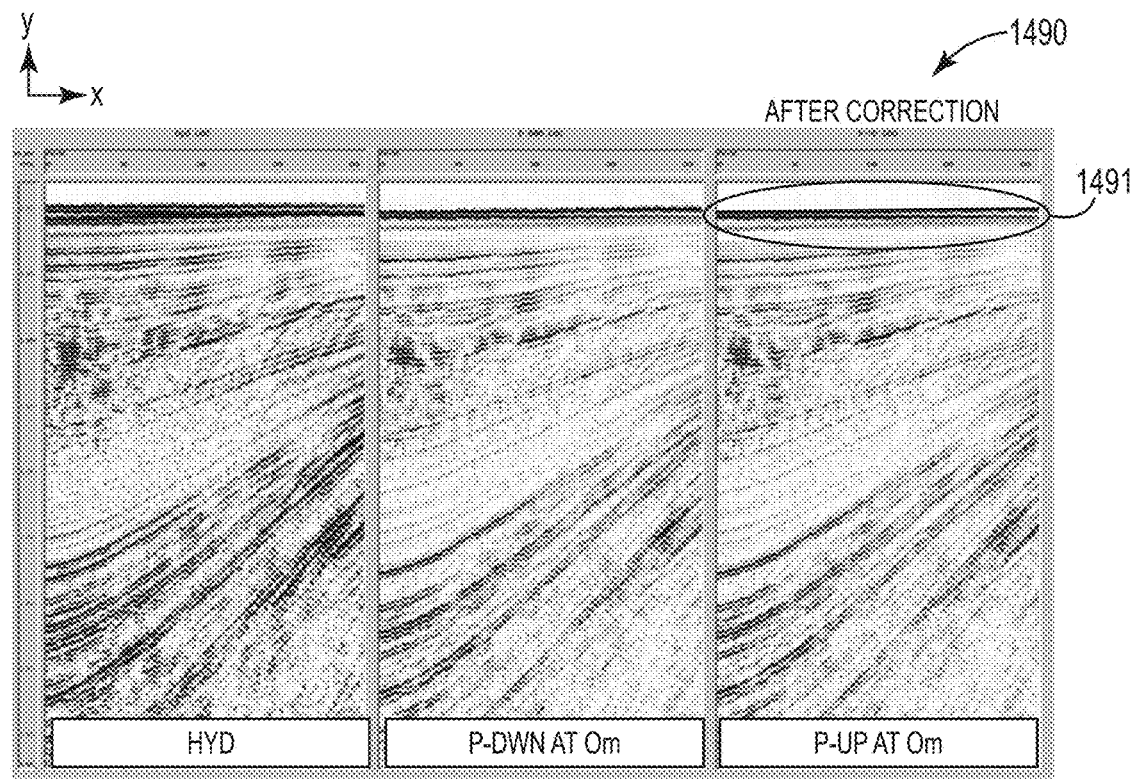
FIG. 14 illustrates an example 2D receiver gather plus LMO after correction of sea surface state according to one or more embodiments of the present disclosure.

FIG. 14 illustrates an example 2D receiver gather 1490 plus LMO after correction of sea surface state according to one or more embodiments of the present disclosure. The x-axis can represent a vessel's travel, and the y-axis can represent a change in data gathered. FIG. 14 can illustrate data points collected over some time period. In the example illustrated in FIG. 14, each trace is collected at a different shot point. The up-going interface data 1491 is smoother as compared to the interface data 1387 of FIG. 13, in response to a correction or compensation for sea surface state variation in accordance with the present disclosure.

Figure 15:
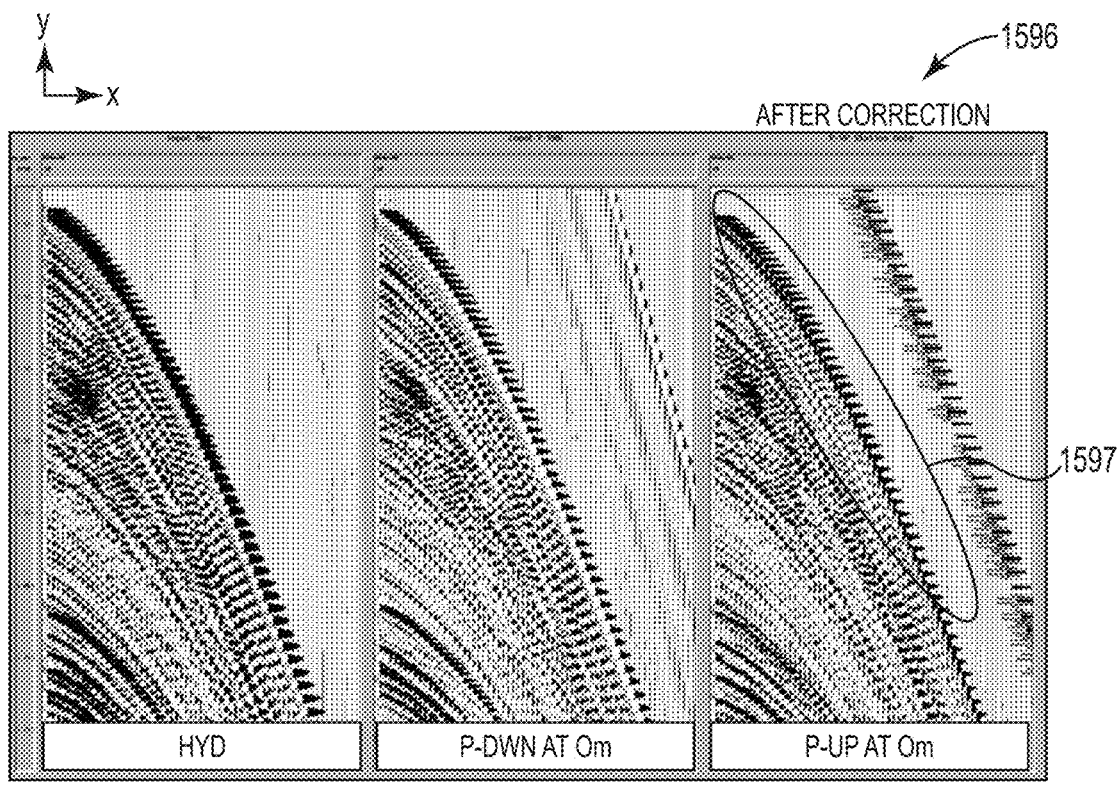
FIG. 15 illustrates an example 2D receiver gather after correction of sea surface state according to one or more embodiments of the present disclosure.

FIG. 15 illustrates an example 2D receiver gather 1596 after correction of sea surface state in according to one or more embodiments of the present disclosure. In the example illustrated in FIG. 15, the x-axis can represent a vessel's travel, and the y-axis can represent a change in data gathered. FIG. 15 can illustrate data points collected over some time period. In the example illustrated in FIG. 15, each trace is collected at a different shot point. The up-going interface data 1597 is smoother as compared to the interface data 1281 of FIG. 12, in response to a correction or compensation for sea surface state variation in accordance with the present disclosure.

In some embodiments, in order to model a realistic sea surface, a number of models, algorithms, and functions may be used. For instance, a Pierson-Moskowitz spectrum and Hasselmann's directivity correction may be used to model a realistic sea surface. Sea surface parameters may be obtained employing spectral analysis. A Kirchhoff-Helmholtz integral can be used to model scattered data from a time-varying 2D sea surface. Sea surface imaging technology may recover 2D time-varying sea surfaces from 3D dual-receiver data (or any multi-sensor acquisition which allows a mathematical separation of the up-going wavefields and down-going wavefields). Accordingly, applying streamer-wise imaging to 3D data may be a possible way of recovering some of the main features of a 2D time-varying sea surface in a number of embodiments. For example, according to a 3D processing embodiment of this disclosure, the sea surface may be imaged by all streamers for a given instant of time. According to a 2D processing embodiment, the sea surface may be imaged by one streamer for a given instant of time. This may then be repeated, for instance, for all streamers. The sea surface profiles corresponding to the same times may then be juxtaposed and interpolated.

Figure 16:
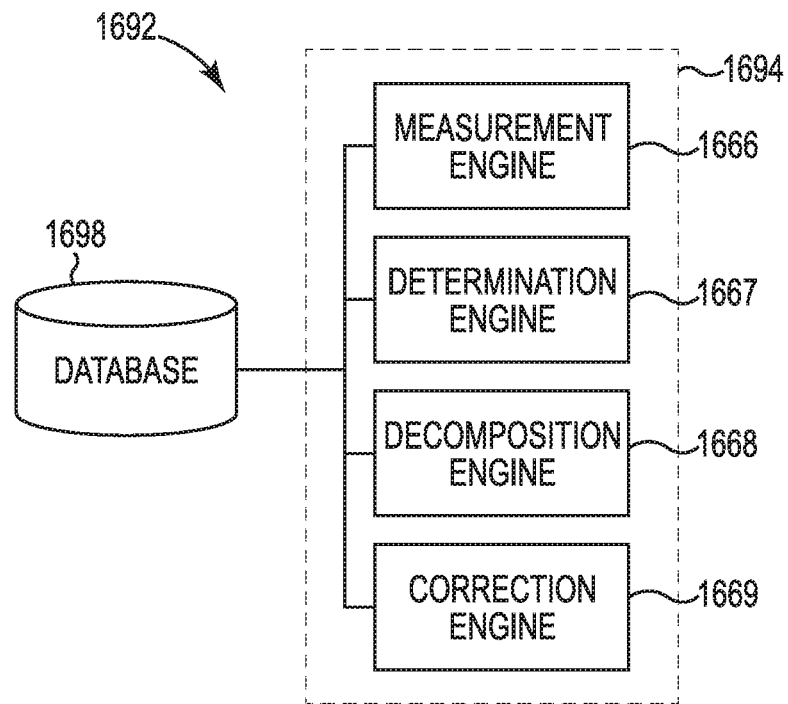
FIG. 16 illustrates a diagram of a system for correction of sea surface state according to one or more embodiments of the present disclosure.

FIG. 16 illustrates a diagram of a system 1692 for correction of sea surface state in accordance with one or more example embodiments of the present disclosure. The system 1692 can include a data store 1698, a subsystem 1694, and/or a number of engines 1666, 1667, 1668, and 1669. The subsystem can include the number of engines, such as measurement engine 1666, determination engine 1667, decomposition engine 1668, and/or correction engine 1669, and can be in communication with the data store 1698 via a communication link. The system 1692 can include additional or fewer engines than illustrated to perform the various functions described herein. The system can represent software and/or hardware of a machine (e.g., machine 1782 as referenced in FIG. 17, etc.).

The number of engines can include a combination of hardware and programming that is configured to perform a number of functions described herein. The programming can include program instructions (e.g., software, firmware, etc.) stored in a memory resource (e.g., computer readable medium, computer readable medium, etc.) as well as hard-wired program.

For example, the measurement engine 1666 can include a combination of hardware and programming that is configured to measure an up-going portion of a wavefield based on an actuation of a source. The measured up-going portion of the wavefield, in some examples, may have been collected by a plurality of receivers. In some embodiments, the determination engine 1667 can include a combination of hardware and programming that is configured to determine, based on the measured up-going portion of the wavefield, a sea surface state at the source.

In a number of embodiments, the decomposition engine 1668 can include a combination of hardware and programming that is configured to decompose the sea surface state at the source and at at least one of the plurality of receivers. In some examples, the decomposition can be configured to decompose the sea surface effect using cross-correlations of an ensemble of source units, channels, and receivers, in various combinations associated with the source and the streamer. The ensemble of source units, channels, and receivers can include, for instance, a constant distance from the source to the sea surface, a constant channel direction, and a constant receiver direction.

In some embodiments, the correction engine 1669 can include a combination of hardware and programming that is configured to correct for the sea surface state at the source and at the at least one of the plurality of receivers based on the decomposition. The sea surface state can include, for example, a sea surface state variation on the up-going portion(s) of the wavefield at particular receiver locations on the source side of a towed streamer and/or at the at least one of the plurality of receivers.

In a number of examples, system 1692 can include a record engine including a combination of hardware and programming configured to simultaneously record traces received from the source and display the traces as a random time delay between traces via a graphical user interface. System 1692 can further comprise a design engine including a combination of hardware and programming configured to design a time window in which to correct for the sea surface state at the source and at the at least one of the plurality of receivers.

Figure 17:
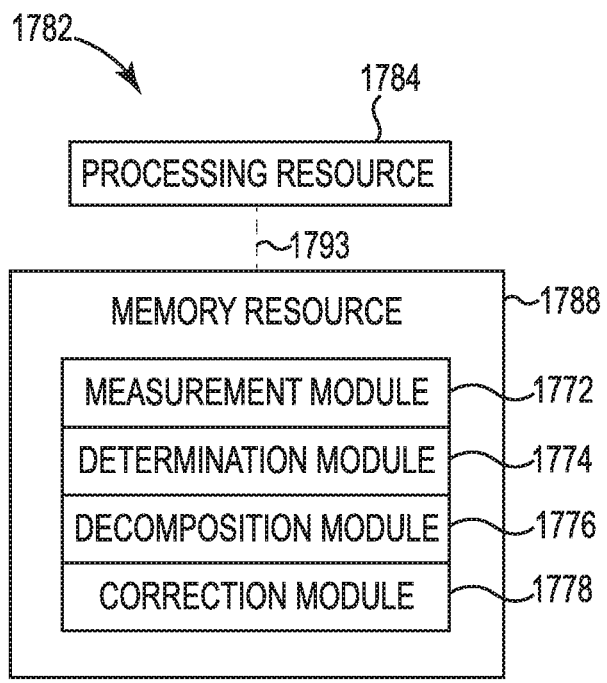
FIG. 17 illustrates a diagram of a machine for correction of sea surface state according to one or more embodiments of the present disclosure.

Each of the number of engines 1666, 1667, 1668, 1669 can include hardware and/or a combination of hardware and programming that can function as a corresponding module as described with respect to FIG. 17. For example, the measurement engine 1666 can include hardware and/or a combination of hardware and programming that can function as the measurement module 1772, the determination engine 1667 can include hardware and/or a combination of hardware and programming that can function as the determination module 1774, the decomposition engine 1668 can include hardware and/or a combination of hardware and programming that can function as the decomposition module 1776, and/or the correction engine 1669 can include hardware and/or a combination of hardware and programming that can function as the correction module 1778.

FIG. 17 illustrates a diagram of a machine 1782 for correction of sea surface state in accordance with one or more example embodiments of the present disclosure. The machine 1782 can utilize software, hardware, firmware, and/or logic to perform a number of functions. The machine 1782 can be a combination of hardware and program instructions configured to perform a number of functions. The hardware, for example, can include a number of processing resources 1784 and a number of memory resources 1788, such as a machine-readable medium (MRM) or other memory resources 1788. The memory resources 1788 can be internal and/or external to the machine 1782. The program instructions may be machine-readable instructions (MRI) and can include instructions stored on the MRM to implement a particular function (e.g., sea surface state correction). The set of MRI can be executable by one or more of the processing resources 1784. The memory resources 1788 can be coupled to the machine 1782 in a wired and/or wireless manner. For example, the memory resources 1788 can be an internal memory, a portable memory, a portable disk, and/or a memory associated with another resource, enabling MRI to be transferred and/or executed across a network such as the Internet.

Memory resources 1788 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The processing resources 1784 can be coupled to the memory resources 1788 via a communication path 1793. The communication path 1793 can be local or remote to the machine 1782. Examples of a local communication path 1793 can include an electronic bus internal to a machine, where the memory resources 1788 are in communication with the processing resources 1784 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 1793 can be such that the memory resources 1788 are remote from the processing resources 1784, such as in a network connection between the memory resources 1788 and the processing resources 1784. That is, the communication path 1793 can be a network connection. Examples of such a network connection can include LAN, wide area network (WAN), PAN, and the Internet, among others.

As shown in FIG. 17, the MRI stored in the memory resources 1788 can be segmented into a number of modules 1772, 1774, 1776, 1778 that when executed by the processing resources 1784 can perform a number of functions. As used herein, a "module" includes a set of instructions included to perform a particular task or action. The number of modules 1772, 1774, 1776, 1778 can be sub-modules of other modules. For example, the measurement module 1772 can be a sub-module of the determination module 1774 and/or the measurement module 1772 and the determination module 1774 can be contained within a single module. Furthermore, the number of modules 1772, 1774, 1776, 1778 can comprise individual modules separate and distinct from one another. Examples are not limited to the specific modules 1772, 1774, 1776, 1778 illustrated in FIG. 17.

The machine 1782 can include a measurement module 1772, which can include instructions to receive up-going wavefield data and source-side data collected from receivers (or any multi-sensor acquisition which allows a mathematical separation of the up-going wavefields and down-going wavefields). The source-side data, in some examples, may be associated with a sea surface state. Measurement module 1772 can include instructions to collect down-going wavefield data in conjunction with the up-going wavefield data from the receiver (or any multi-sensor acquisition which allows a mathematical separation of the up-going wavefields and down-going wavefields) associated with the sea surface state. The machine 1782 can also include a determination module 1774, which can include instructions to calculate a cross-correlation at a constant channel between consecutive shot points using the collected data, calculate a cross-correlation at a constant channel within a constant receiver between consecutive shot points using the collected data, and calculate a cross-correlation within a constant receiver between consecutive shot points using the collected data.

In some examples, measurement module 1772 can include instructions to calculate the cross-correlation at the constant channel between consecutive shot points as a function of a geology of the area from which the data was collected and a sea surface state variation. Measurement module 1772 can also include instructions to calculate the cross-correlation at the constant channel within a shot point between consecutive channels as a function of source and receiver velocity and a geology of the area from which the data was collected. In some instances, measurement module 1772 can include instructions to calculate the cross-correlation within the constant receiver.

In addition, the machine 1782 can include a decomposition module 1776, which can include instructions to separate the down-going wavefield data and the up-going wavefield collected via the measurement module 1772 prior to the cross-correlation calculations performed via the determination module 1774. The machine 1782 can also include a correction module 1778, which can include instructions to correct the sea surface state based on the calculated cross-correlations.

Figure 18:
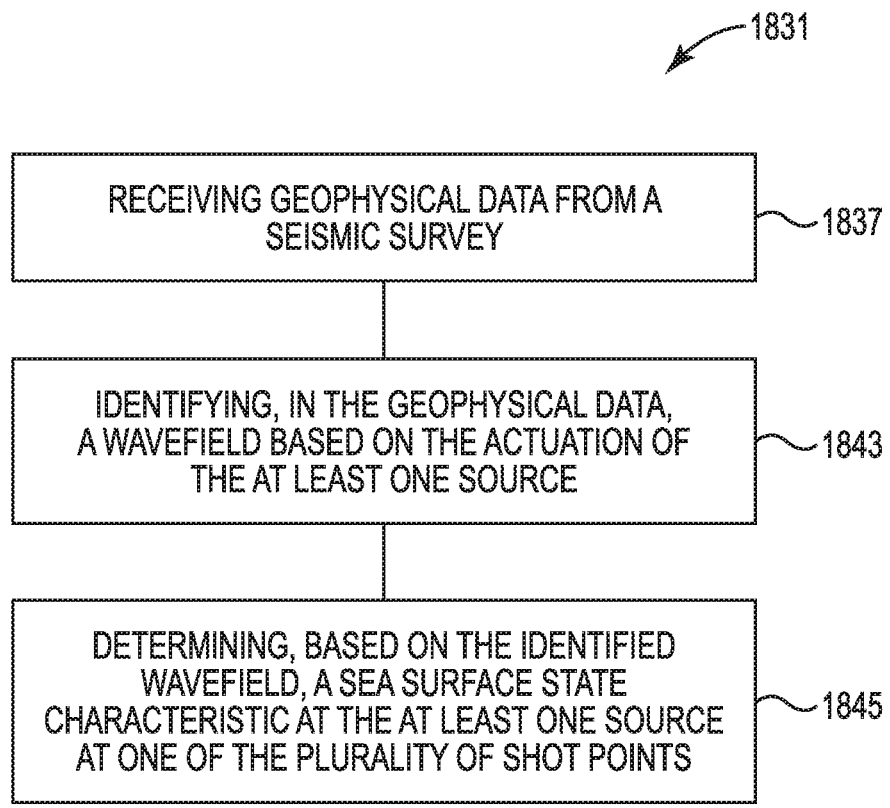
FIG. 18 illustrates an example method for correction of sea surface state according to one or more embodiments of the present disclosure.

FIG. 18 illustrates an example method 1831 for correction of sea surface state according to one or more embodiments of the present disclosure. At 1837, method 1831 can include receiving geophysical data from a seismic survey. The seismic survey can utilize a plurality of receivers disposed in a body of water and at least one source in the body of water, actuated at a plurality of shot points. In some examples, the disposed receivers can be associated with a towed streamer, and the towed streamer can comprise a dual-receiver streamer or any multi-sensor acquisition which can allow for mathematical separation of up-going and down-going wavefields. At 1843, method 1831 can include identifying, in the geophysical data, a wavefield based on the actuation of the at least one source. A unique estimation of a sea surface state for a location of the at least one source at the moment that source is actuated in some instances.

At 1845, method 1831 can include determining, based on the identified wavefield, a sea surface state at the at least one source at one of the plurality of shot points. Determining the sea surface state can include, in some examples, separating up-going portions of the identified wavefield from down-going portions of the identified wavefield and determining source-side effects in the up-going wavefield. Determining the sea surface state can also include cross-correlating constant receiver and constant channel ensembles and statistically filtering and extracting a surface consistent time correction to apply to the plurality of shot points based on the cross-correlation. As used herein, "cross-correlating a constant channel ensemble" can include cross-correlating a constant channel between consecutive shot points and/or within a shot point between consecutive channels. "Cross-correlating a constant receiver ensemble", as used herein, can include cross-correlating within a constant receiver between consecutive shot points.

Determining the sea surface state can include, in some examples, comparing an up-going portion of the identified wavefield to an up-going portion of a different identified wavefield and determining the sea surface state based on the comparison.

In accordance with a number of embodiments of the present disclosure, a geophysical data product may be produced. The geophysical data product may include, for example, estimations of sea surface state and/or seismic data with correction of sea surface state. Geophysical data may be obtained and stored on a non-transitory, tangible machine-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, estimation of sea surface state can be performed on seismic data offshore to facilitate other processing of the measured data either offshore or onshore. As another example, the correction of sea surface state in seismic data can be performed on seismic data offshore or onshore to facilitate other processing of data either offshore or onshore.

Figure 19:
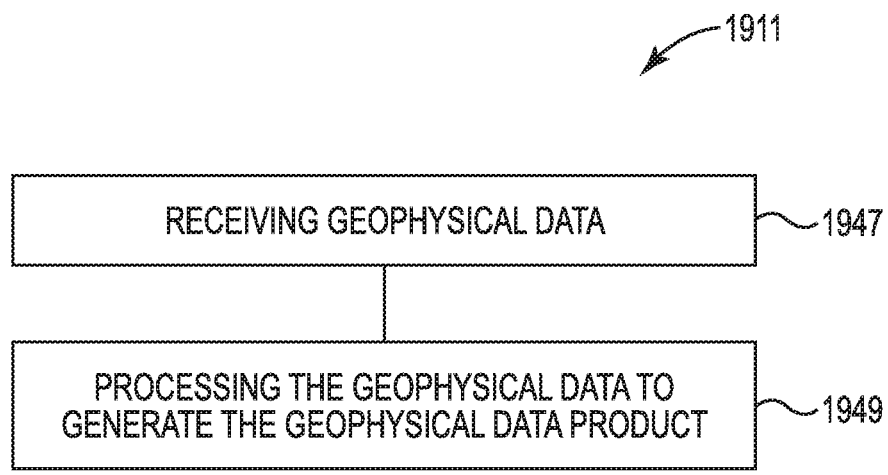
FIG. 19 illustrates an example method for correction of sea surface state according to one or more embodiments of the present disclosure.

FIG. 19 illustrates an example method 1911 for correction of sea surface state according to one or more embodiments of the present disclosure. For instance, method 1911 can include generating a geophysical data product associated with correction of sea surface state. At 1947, method 1911 can include receiving geophysical data and at 1949, method 1911 can include processing the geophysical data to generate the geophysical data product. Processing the geophysical data can include, in some examples, identifying, in the geophysical data, a wavefield based on the actuation of the at least one source and determining, based on the identified wavefield, a sea surface state at the at least one source actuated at a plurality of shot points.

In some instances, processing the geophysical data can further include separating up-going portions of the measured wavefield from down-going portions of the identified wavefield and determining source-side effects in the up-going wavefield. Processing the geophysical data can also include cross-correlating constant receiver and constant channel ensembles and statistically filtering and extracting a surface consistent time correction to apply to the plurality of shot points based on the cross-correlation.

Though not illustrated in FIG. 19, method 1911 can include, in some examples, recording the geophysical data product on a non-transitory machine-readable medium suitable for importing onshore. Method 1911 can also include performing geophysical analysis on the geophysical data product onshore and/or offshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
  receiving from a seismic survey of a subsurface location, geophysical data measured by a plurality of receivers disposed in a body of water based on operation of at least one source actuated at a plurality of shot points, wherein the geophysical data is indicative of a subterranean formation;
  processing the geophysical data, comprising:
    identifying in the geophysical data, wavefield data based on the actuation of the at least one source;
    denoising the wavefield data;
    separating the wavefield data into up-going wavefield data and down-going wavefield data;
    determining a source-side effect in the up-going wavefield data;
    determining, based on the up-going wavefield data and the source-side effect, a sea surface state at the at least one source at one of the plurality of shot points, wherein determining the sea surface state comprises:
      cross-correlating different data within a constant receiver ensemble;
      statistically filtering and extracting a surface consistent time correction to apply to the plurality of shot points based on the cross-correlation of the different data within the constant receiver ensemble; and calculating a cross-correlation between a first channel and a second channel at each receiver location with respect to the one of the plurality of shot points using the received data and based on source and receiver velocity and a geology of the area from which the data was received,
    wherein the first channel comprises wavefield data recorded from a first of the plurality of receivers at a first location on a streamer, the second channel comprises wavefield data recorded from a second of the plurality of receivers at a second location on the streamer, and the first channel and the second channel are consecutive channels;
generating a unique estimation of a sea surface state for a location of the at least one source at the moment the at least one source is actuated;
simultaneously recording a plurality of traces associated with the plurality of shot points received from the at least one source including embedding each of the plurality of traces with data about the sea surface state at the at least one source associated with the plurality of shot points; and
displaying the embedded traces as a random time delay between traces via a graphical user interface;
removing an effect of a variation in the sea surface state from the up-going wavefield data of the geophysical data based on the determined sea surface state such that the sea surface state appears flat during modeling of a sea surface even if an associated vessel and the at least one source are moving up and down;
modeling the sea surface using the geophysical data having the removed effect, wherein the model comprises geophysical data that is more accurate as compared to the received geophysical data;
displaying, as a receiver gather, the more accurate geophysical data; and
recording the model and the receiver gather on a non-transitory machine-readable medium.

2. The method of claim 1, wherein the plurality of receivers comprise receivers allowing for mathematical separation of up-going and down-going wavefield data.

3. The method of claim 1, wherein determining the sea surface state comprises:
separating the up-going wavefield data and down-going wavefield data within the identified wavefield data.

4. The method of claim 1, wherein the determining the sea surface state comprises:
comparing an up-going portion of the wavefield data to an up-going portion of wavefield data associated with a different wavefield; and
determining the sea surface state based on the comparison.

5. A non-transitory machine-readable medium storing instructions executable by a processing resource to cause a computing system to:
receive from a seismic survey of a subsurface location, seismic data comprising up-going wavefield data and source-side data measured by a plurality of receivers disposed in a body of water based on operation of at least one source, wherein the up-going wavefield data and the source-side data is indicative of a subterranean formation,
generate a unique estimation of a sea surface state for a location of the at least one source at the moment the at least one source is actuated based on the source-side data;
process the up-going wavefield data and the source-side data, comprising:
    determine a source-side effect in the up-going wavefield data;
    cross-correlating different data within a constant receiver ensemble;
    statistically filter and extract a surface consistent time correction to apply to the plurality of shot points based on the cross-correlation of the different data within the constant receiver ensemble; and
    calculate a cross-correlation between a first channel and a second channel at each receiver location with respect to the plurality of shot points using the collected data,
        wherein the first channel comprises wavefield data recorded from a first of the plurality of receivers at a first location on a streamer, the second channel comprises wavefield data recorded from a second of the plurality of receivers at a second location on the streamer, and the first and the second channels are consecutive channels;
correct the sea surface state using the statistically filtered and extracted surface time correction applied to the plurality of shot points, wherein the correction includes removal of an effect of a variation in the sea surface state from the seismic data such that the sea surface state appears flat during modeling of a sea surface even if an associated vessel and the at least one source are moving up and down;
model the sea surface using the seismic data having the removed effect, wherein the model comprises seismic data that is more accurate as compared to the received seismic data;
display, as a receiver gather, the more accurate seismic data; and
record the model and the receiver gather on the non-transitory machine-readable medium.

6. The non-transitory machine-readable medium of claim 5, further comprising instructions executable to:
collect down-going wavefield data in conjunction with the up-going wavefield data from the receivers associated with the sea surface state; and
separate the down-going wavefield data and the up-going wavefield data prior to calculating the cross-correlations.

7. A system, comprising:
a measurement engine to measure seismic data indicative of a subterranean formation including up-going wavefield data based on an actuation of a source at a plurality of shot points,
    wherein the measured up-going wavefield data has been measured by a plurality of receivers disposed in a body of water based on operation of the source;
a determination engine to process the up-going wavefield data, comprising:
    the determination engine to:
        determine a source-side effect in the up-going wavefield data;
        determine, based on the measured up-going wavefield data and the source-side effect, a unique estimation of a sea surface state for a location of the source at the moment the source is actuated, wherein the determination comprises:

cross-correlating different data within a constant receiver ensemble;
statistically filtering and extracting a surface consistent time correction to apply to the plurality of shot points based on the cross-correlation of the different data within the constant receiver ensemble;
a decomposition engine to:
decompose, into up-going and down-going wavefield portions, an effect of the sea surface state associated with the source and at least one of the plurality of receivers;
decompose, into up-going and down-going wavefield portions, the effect of the sea surface state using cross-correlations of an ensemble of data of source units, channels, and receivers, in various combinations associated with the source and the at least one receiver,
wherein the channels comprise wavefield data recorded from the plurality of receivers at a plurality of locations on a streamer; and
wherein the ensemble of data of source units, channels, and receivers include data associated with a constant distance from the source to a sea surface and a physical constant receiver direction; and
a correction engine to:
correct for the sea surface state at the source and at the at least one of the plurality of receivers based on the decomposition and by removing the effect of the sea surface state from the up-going wavefield data such that the sea surface state appears flat during modeling of a sea surface even if an associated vessel and the at least one source are moving up and down;
model the sea surface using the up-going wavefield data having the removed effect, wherein the model comprises seismic data that is more accurate as compared to the measured seismic data;
instructions executable by a processor to:
display, as a receiver gather, the more accurate measured seismic data; and
record the model and the receiver gather on a non-transitory machine-readable medium.

8. The system of claim 7, wherein the sea surface state includes a sea surface state variation on the up-going wavefield data at the at least one of the plurality of receivers.

9. The system of claim 7, further comprising a record engine to:
simultaneously record traces received from the source; and
display the traces as a random time delay between traces via a graphical user interface.

10. The system of claim 7, further comprising a design engine to design a time window in which to correct for the sea surface state at the source and at the at least one of the plurality of receivers.

11. A method comprising:
receiving from a seismic survey of a subsurface location, geophysical data measured by a plurality of receivers disposed in a body of water based on operation of at least one source actuated at a plurality of shot points, wherein the geophysical data is indicative of a subterranean formation;
processing the geophysical data, comprising:
identifying in the geophysical data, wavefield data based on the actuation of the at least one source;
denoising the wavefield data;
separating the wavefield data into up-going wavefield data and down-going wavefield data;
determining a source-side effect in the up-going wavefield data;
determining, based on the up-going wavefield data and the source-side effect, a unique sea surface state at the at least one source at one of the plurality of shot points at the moment the at least one source was actuated,
wherein determining the sea surface state comprises:
cross-correlating different data within a constant receiver ensemble;
statistically filtering and extracting a surface consistent time correction to apply to the plurality of shot points based on the cross-correlation of the different data within the constant receiver ensemble; and
calculating a cross-correlation between a first channel and a second channel at each receiver location with respect to the one of the plurality of shot points using the received data and based on source and receiver velocity and a geology of the area from which the data was received,
wherein the first channel comprises wavefield data recorded from a first of the plurality of receivers at a first location on a streamer, the second channel comprises wavefield data recorded from a second of the plurality of receivers at a second location on the streamer, and the first channel and the second channel are consecutive channels;
removing an effect of a variation in the sea surface state from the geophysical data based on the determined sea surface state such that the sea surface state appears flat during modeling of a sea surface even if an associated vessel and the at least one source are moving up and down;
modeling the sea surface using the geophysical data having the removed effect, wherein the model comprises geophysical data that is more accurate as compared to the received geophysical data;
displaying, as a receiver gather, the more accurate geophysical data; and
recording the model and the receiver gather on a non-transitory machine-readable medium.

12. The method of claim 11, further comprising recording the geophysical data on a non-transitory machine-readable medium suitable for importing onshore.

* * * * *